(12) United States Patent
Yoshida et al.

(10) Patent No.: US 11,104,371 B2
(45) Date of Patent: Aug. 31, 2021

(54) STEERING DEVICE

(71) Applicant: HITACHI AUTOMOTIVE SYSTEMS, LTD., Hitachinaka (JP)

(72) Inventors: Osamu Yoshida, Yokohama (JP); Kiyotaka Shirakubo, Ayase (JP); Satoshi Doi, Hachioji (JP); Yumi Ayukawa, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 225 days.

(21) Appl. No.: 16/528,277

(22) Filed: Jul. 31, 2019

(65) Prior Publication Data
US 2020/0047789 A1 Feb. 13, 2020

(30) Foreign Application Priority Data

Aug. 7, 2018 (JP) .............................. JP2018-148330

(51) Int. Cl.
*B62D 1/20* (2006.01)
*F16F 15/136* (2006.01)
*F16D 3/68* (2006.01)
*B62D 5/04* (2006.01)

(52) U.S. Cl.
CPC ................. *B62D 1/20* (2013.01); *B62D 5/04* (2013.01); *F16D 3/68* (2013.01); *F16F 15/136* (2013.01)

(58) Field of Classification Search
CPC ................. F16D 3/68; B62D 1/20; B62D 5/04
See application file for complete search history.

(56) References Cited

U.S. PATENT DOCUMENTS

| 2011/0240399 A1* | 10/2011 | Suzuki | F16D 3/68 180/444 |
| 2015/0298733 A1* | 10/2015 | Moriyama | F16H 1/16 180/444 |
| 2016/0194024 A1* | 7/2016 | Kikuchi | F16H 55/22 180/444 |
| 2017/0036691 A1* | 2/2017 | Kikuchi | F16D 11/10 |
| 2017/0058991 A1* | 3/2017 | Kim | F16D 3/68 |
| 2020/0369315 A1* | 11/2020 | Honda | H02K 7/003 |

FOREIGN PATENT DOCUMENTS

JP 2009-138886 A 6/2009

* cited by examiner

*Primary Examiner* — Tony H Winner
(74) *Attorney, Agent, or Firm* — Foley & Lardner LLP

(57) ABSTRACT

A steering device includes: a coupling including a first coupling member, a second coupling member, and an elastic member, the elastic member which is made from a resin, and which includes an elastic member base portion, a first rotation direction elastic portion, a second rotation direction elastic portion, a third rotation direction elastic portion, a fourth rotation elastic portion, and an axial elastic portion, the axial elastic portion which is provided to the elastic member base portion, and which is arranged to be bent in a direction to be inclined with respect to the first axis when a clearance between the first shaft member assembly and the second shaft member assembly in the direction of the first axis is decreased.

17 Claims, 9 Drawing Sheets

STEERING DEVICE

BACKGROUND

The present invention relates to a steering device.

A Japanese Patent Application Publication No. 2009-138886 discloses a conventional electric power steering device including a coupling for a connection between a motor shaft of an electric motor and a worm shaft. The coupling includes an outer teeth member fixed to the motor shaft of the electric motor; and an inner teeth member fixed to the worm shaft. A shock absorbing member is disposed between the outer teeth member and the inner teeth member so as to absorb load variation generated between the motor shaft of the electric motor and the worm shaft.

SUMMARY

However, in the above-described conventional device, at an assembling operation of the outer teeth member and the inner teeth member, the shock absorbing member disposed between the outer teeth and the inner teeth is pressed in an axial direction to be compressed and deformed, so as to adjust a clearance between the outer teeth member and the inner teeth member. Accordingly, a rigidity force of the shock absorbing member is high. It is difficult to adjust the axial clearance. Consequently, misalignment between axes of the motor shaft mounted to the outer teeth member, and the worm shaft to which the inner teeth is mounted is generated. Therefore, the vibration may be provided to the worm gear. The torque variation may be generated.

It is, therefore, an object of the present invention to provide a steering device devised to solve the above-described problems, and to suppress the vibration and so on of the worm gear at the driving of the electric motor.

According to one aspect of the present invention, a steering device comprises:

a rack bar which includes a rack teeth portion, and which is arranged to turn steered wheels;

a pinion shaft including a pinion teeth portion arranged to be engaged with the rack teeth portion of the rack bar;

a worm wheel which is arranged to rotate as a unit with the pinion shaft, and which includes a wheel teeth portion;

a worm shaft including a worm teeth portion arranged to be engaged with the wheel teeth portion of the worm wheel;

an electric motor which includes a motor shaft, and which is arranged to rotate the worm shaft;

a coupling including a first coupling member, a second coupling member, and an elastic member, a first shaft member being one of the worm shaft and the motor shaft;

a second shaft member being the other of the worm shaft and the motor shaft;

a first shaft member assembly including the first shaft member and the first coupling member;

a second shaft member assembly including the second shaft member and the second coupling member;

the first coupling member including a first coupling base portion, a first outer blade portion, a second outer blade portion, and a third outer blade portion, the first coupling base portion provided to the first shaft member, the first outer blade portion which is provided to the first coupling base portion, and which protrudes in a radially outward direction with respect to a first axis which is a rotation axis of the first shaft member, the second outer blade portion which is provided to the first coupling base portion, and which protrudes in the radially outward direction with respect to the first axis, the third outer blade portion which is provided to the first coupling base portion, and which protrudes in the radially outward direction with respect to the first axis, the second coupling member including a second coupling base portion, a first inner blade portion, and a second inner blade portion, the second coupling base portion provided to the second shaft member, the first inner blade portion which is provided to the second coupling base portion, which protrudes in a radially inward direction with respect to a second axis that is a rotation axis of the second shaft member, and which is provided between the first outer blade portion and the second outer blade portion in a circumferential direction with respect to the first axis, the second inner blade portion which is provided to the second coupling base portion, which protrudes in the radially inward direction with respect to the second axis, and which is provided between the second outer blade portion and the third outer blade portion in a circumferential direction with respect to the second axis, the elastic member which is made from a resin, and which includes an elastic member base portion, a first rotation direction elastic portion, a second rotation direction elastic portion, a third rotation direction elastic portion, a fourth rotation elastic portion, and an axial elastic portion, the elastic member base portion which is provided between the first shaft member assembly and the second shaft member assembly in a direction of the first axis, the first rotation direction elastic portion which is provided to the elastic member base portion, and which is provided between the first outer blade portion and the first inner blade portion in the circumferential direction with respect to the first axis, the second rotation direction elastic portion which is provided to the elastic member base portion, and which is provided between the second outer blade portion and the first inner blade portion in the circumferential direction with respect to the first axis, the third rotation direction elastic portion which is provided to the elastic member base portion, and which is provided between the second outer blade portion and the second inner blade portion in the circumferential direction with respect to the first axis, the fourth rotation direction elastic portion which is provided to the elastic member base portion, and which is provided between the third outer blade portion and the second inner blade portion in the circumferential direction with respect to the first axis, and the axial elastic portion which is provided to the elastic member base portion, and which is arranged to be bent in a direction to be inclined with respect to the first axis when a clearance between the first shaft member assembly and the second shaft member assembly in the direction of the first axis is decreased.

According to another aspect of the invention, a steering device comprises:

a rack bar which includes a rack teeth portion, and which is arranged to turn steered wheels;

a pinion shaft including a pinion teeth portion arranged to be engaged with the rack teeth portion of the rack bar;

a worm wheel which is arranged to rotate as a unit with the pinion shaft, and which includes a wheel teeth portion;

a worm shaft including a worm teeth portion arranged to be engaged with the wheel teeth portion of the worm wheel;

an electric motor which includes a motor shaft, and which is arranged to rotate the worm shaft;

a coupling including a first coupling member, a second coupling member, and an elastic member, a first shaft member being one of the worm shaft and the motor shaft;

a second shaft member being the other of the worm shaft and the motor shaft;

a first shaft member assembly including the first shaft member and the first coupling member;

a second shaft member assembly including the second shaft member and the second coupling member;

the first coupling member including a first coupling base portion, a first outer blade portion, a second outer blade portion, and a third outer blade portion, the first coupling base portion provided to the first shaft member, the first outer blade portion which is provided to the first coupling base portion, and which protrudes in a radially outward direction with respect to a first axis which is a rotation axis of the first shaft member, the second outer blade portion which is provided to the first coupling base portion, and which protrudes in the radially outward direction with respect to the first axis, the third outer blade portion which is provided to the first coupling base portion, and which protrudes in the radially outward direction with respect to the first axis, the second coupling member including a second coupling base portion, a first inner blade portion, and a second inner blade portion, the second coupling base portion provided to the second shaft member, the first inner blade portion which is provided to the second coupling base portion, which protrudes in a radially inward direction with respect to a second axis that is a rotation axis of the second shaft member, and which is provided between the first outer blade portion and the second outer blade portion in a circumferential direction with respect to the first axis, the second inner blade portion which is provided to the second coupling base portion, which protrudes in the radially inward direction with respect to the second axis, and which is provided between the second outer blade portion and the third outer blade portion in a circumferential direction with respect to the second axis, the elastic member which is made from a resin, and which includes an elastic member base portion, a first rotation direction elastic portion, a second rotation direction elastic portion, a third rotation direction elastic portion, a fourth rotation elastic portion, and an axial elastic portion, the elastic member base portion which is provided between the first shaft member assembly and the second shaft member assembly in a direction of the first axis, the first rotation direction elastic portion which is provided to the elastic member base portion, and which is provided between the first outer blade portion and the first inner blade portion in the circumferential direction with respect to the first axis, the second rotation direction elastic portion which is provided to the elastic member base portion, and which is provided between the second outer blade portion and the first inner blade portion in the circumferential direction with respect to the first axis, the third rotation direction elastic portion which is provided to the elastic member base portion, and which is provided between the second outer blade portion and the second inner blade portion in the circumferential direction with respect to the first axis, the fourth rotation direction elastic portion which is provided to the elastic member base portion, and which is provided between the third outer blade portion and the second inner blade portion in the circumferential direction with respect to the first axis, and the axial elastic portion which is provided to the elastic member base portion, which protrudes in the direction of the first axis from the first shaft member toward the second shaft member, which includes an axial elastic portion base portion adjacent to the elastic portion base portion, and an axial elastic portion tip end portion abutted on the second shaft member assembly, and a line connecting the axial elastic portion base portion and the axial elastic portion tip end portion being inclined with respect to the first axis.

DETAILED DESCRIPTION

Hereinafter, steering device according to embodiments of the present invention are explained with reference to the drawings. The present invention is not limited to the below-described embodiments. The present invention includes various variations and modifications as long as they are not deviated from the gist of the present invention.

Figure 1:
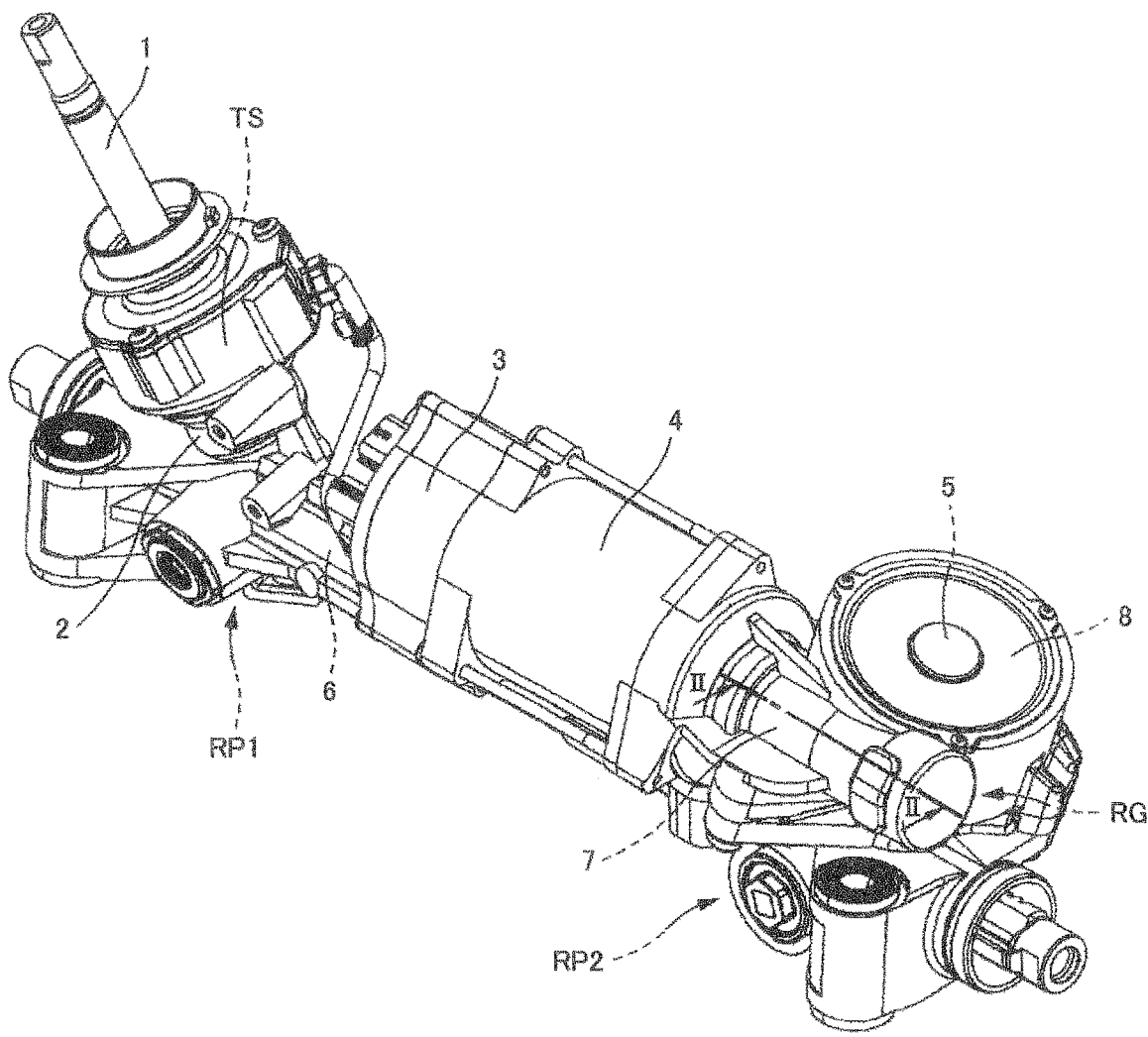
FIG. 1 is a configuration view showing a steering device according to a first embodiment of the present invention.
Figure 2:
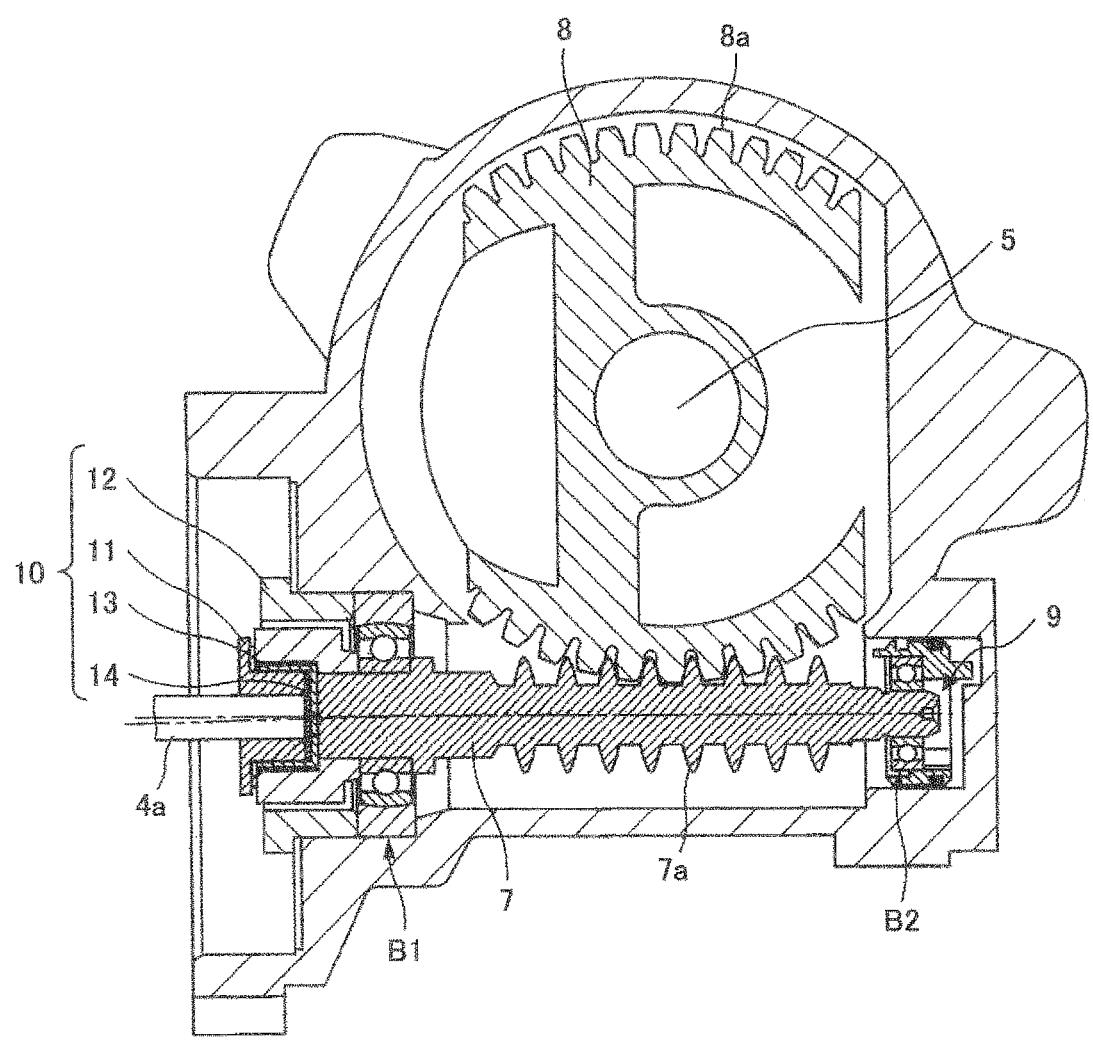
FIG. 2 is a sectional view taken along a section line II-II of FIG. 1.

FIG. 1 is a configuration view showing a steering device according to a first embodiment of the present invention. FIG. 2 is a sectional view taken along a section line II-II in FIG. 1. The steering device in this embodiment is an electric power steering device including an electric motor.

The electric power steering device is a rack and pinion type electric power steering device of a dual pinion type. The rack and pinion type electric power steering device includes a rack bar which includes a rack teeth portion (not shown), and which is arranged to turn steered wheels; and a pinion shaft including a pinion teeth portion engaged with the rack teeth portion of the rack bar.

In FIG. 1, a steering wheel (not shown) is connected to an input shaft 1. A rotation force inputted from the input shaft 1 is inputted to a first output shaft 2 which is a first pinion shaft connected through a torsion bar (not shown) to be relatively rotated. The first output shaft 2 is linked to the steered wheels (not shown) through a first rack and pinon mechanism RP1 which is a first steering mechanism provided on a first side in a vehicle body widthwise direction. Moreover, various sensors such as a torque sensor TS are disposed on outer circumferences of the input shaft 1 and the first output shaft 2. An electric control unit 3 drives an electric motor 4 based on output signals from the sensors. The electric motor 4 is connected with a speed reducer RG including worm gears. A second output shaft 5 which is a second pinion shaft is arranged to vary a direction of the steered wheels (not shown) through a second rack and pinion mechanism RP2 which is a second steering mechanism, and which is provided on a second side in the vehicle body widthwise direction.

By the above-described configuration, the torsion bar (not shown) is twisted and deformed based on the steering torque inputted from the steering wheel (not shown) to the input shaft 1. The first output shaft 2 is arranged to be rotated based on the rotation torque generated at the restoration of the torsion bar in accordance with the twist deformation. The rotation movement of the first output shaft 2 is converted to a linear movement of a rack shaft 6 through the first rack and pinion mechanism RP1. Moreover, the second output shaft 5 is arranged to be rotated based on the steering assist torque generated by the electric motor 4 based on the steering torque. The rotation movement of the second output shaft 5 is converted to the linear movement of the rack shaft 6 through the second rack and pinion mechanism RP2. With these, the directions of the steered wheels are varied while obtaining the steering assist by the electric motor 4.

As shown in FIG. 1 and FIG. 2, the speed reducer RG includes a worm shaft 7 (second shaft member) which is connected through a coupling 10 coaxially to a tip end portion of a motor shaft 4a (first shaft member) of the electric motor 4, and which includes a worm teeth portion 7a that is provided at a tip end of the worm shaft 7, and that constitutes the worm gear; and a worm wheel 8 which is fixed to an outer circumference surface of a base end side of the second output shaft 5 to rotate as a unit with the second output shaft 5, which includes a wheel teeth portion 8a formed on an outer circumference of the worm wheel 8, which is engaged with the worm shaft 7 through the wheel teeth portion 8a, and which is arranged to reduce the speed of the rotation speed of the electric motor 4, and to transmit the speed-reduced rotation to the second output shaft 5. The electric motor 4 is arranged to rotate the worm shaft 7.

The worm shaft 7 includes a first end portion which is the motor shaft 4a side, and which is swingably rotatably supported by a first bearing B1 that is a swivelable ball bearing; and a second end portion which is rotatably supported by a second bearing B2 that is a known ball bearing. An adjusting mechanism 9 is provided on an outer circumference of the second bearing B2. The adjusting mechanism 9 is arranged to constantly push (urge) the second end portion of the worm shaft 7 with the second bearing B2 in a direction in which the engagement between the worm shaft 7 and the worm wheel 8 is strengthened, and thereby to adjust a backlash (inter-shaft) between the both teeth portions 7a and 8a.

Figure 3:
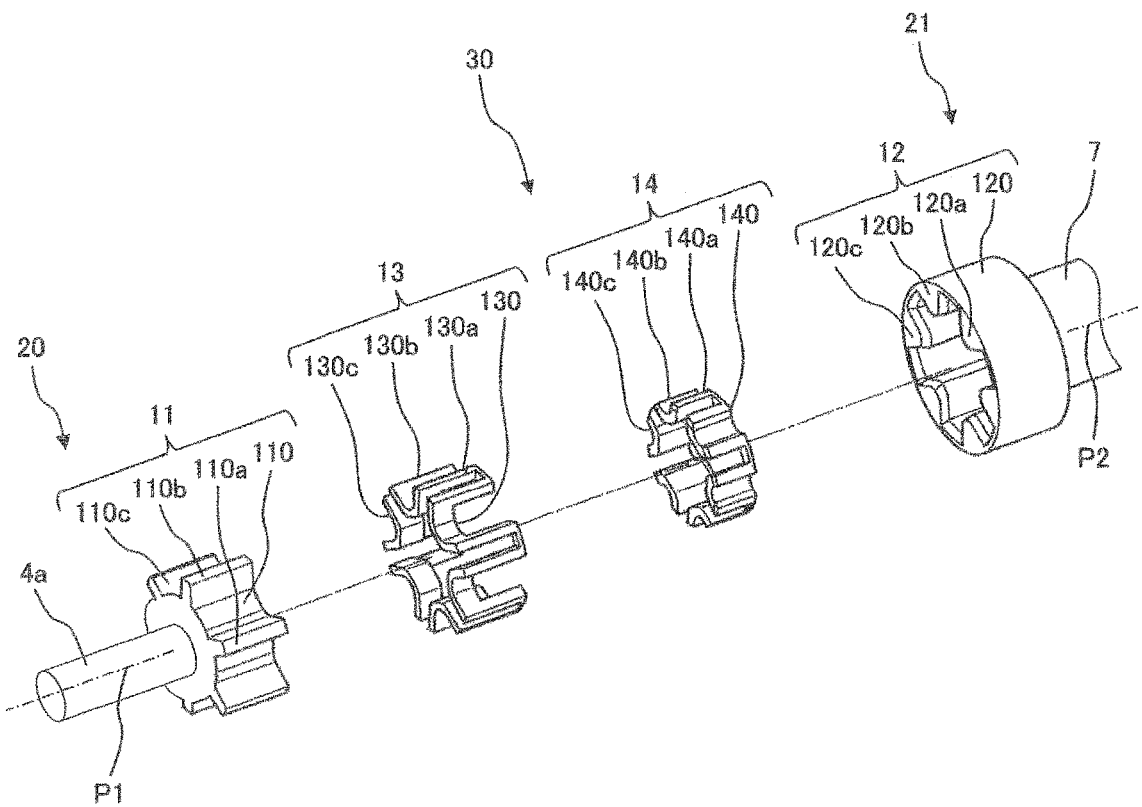
FIG. 3 is an exploded perspective view showing a coupling according to the first embodiment of the present invention.
Figure 4:
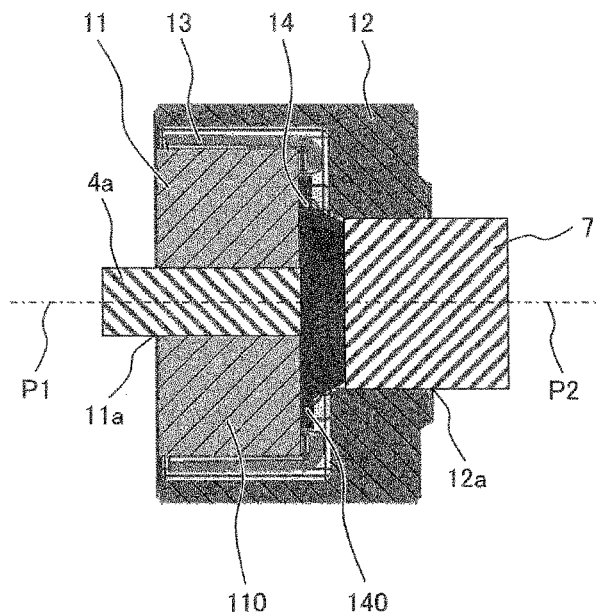
FIG. 4 is an axial sectional view showing the coupling according to the first embodiment of the present invention.
Figure 5:
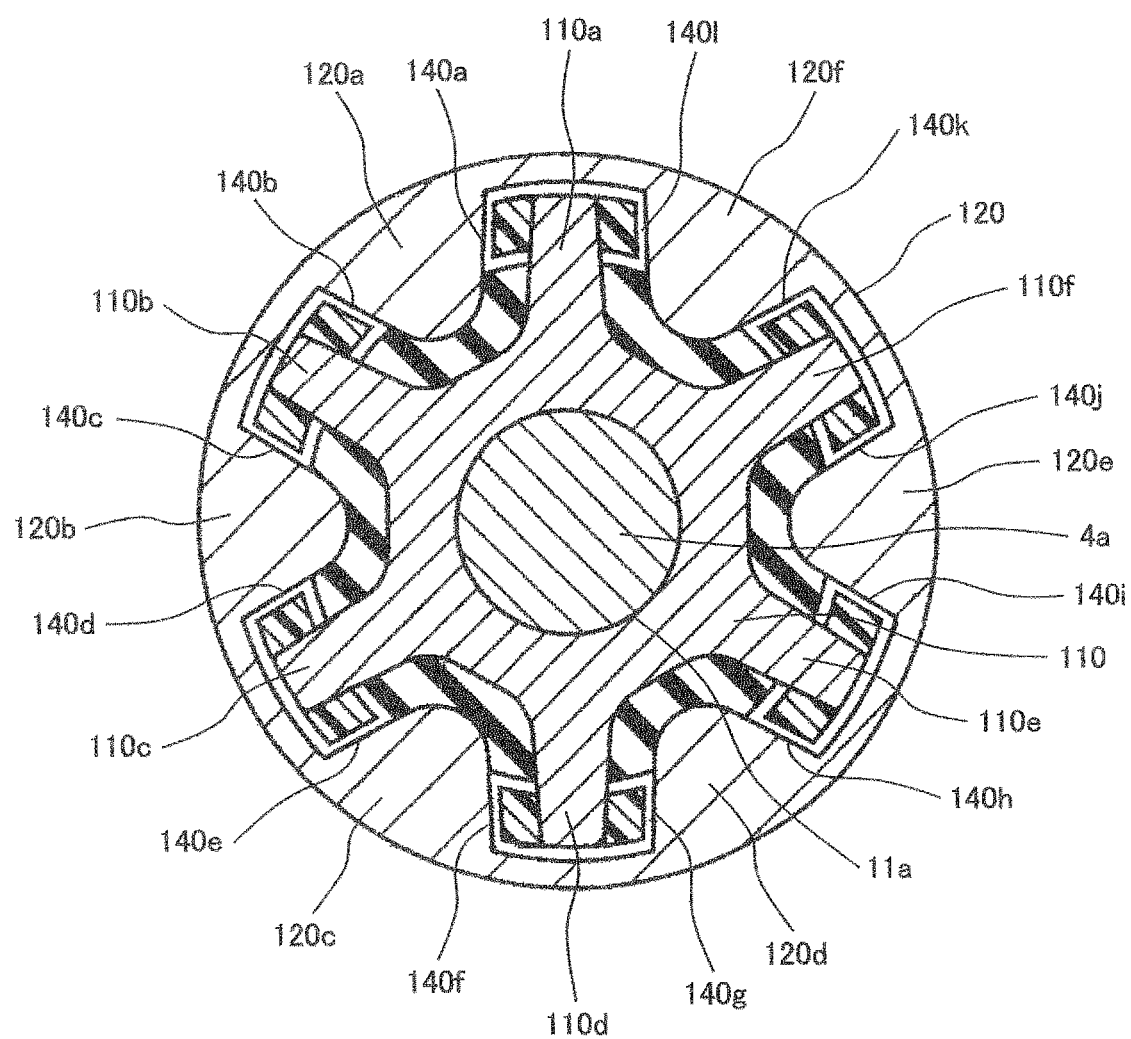
FIG. 5 is a sectional view taken across an axial direction of the coupling according to the first embodiment of the present invention.

Next, a configuration of the coupling 10 is explained. FIG. 3 is an exploded perspective view showing the coupling in the first embodiment of the present invention. FIG. 4 is an axial sectional view showing the coupling in the first embodiment of the present invention. FIG. 5 is a sectional view taken across the axial direction of the coupling in the first embodiment of the present invention (a sectional view of the coupling in the first embodiment of the present invention when viewed in the axial direction).

As shown in FIG. 2 to FIG. 5, the coupling 10 includes an outer teeth member 11 (first coupling member) provided at a tip end portion of the motor shaft 4a of the electric motor 4 to rotate as a unit with the motor shaft 4a; an inner teeth member 12 (second coupling member) which is provided at the first end portion of the worm shaft 7 to rotate as a unit with the worm shaft 7, and which is engaged with the outer teeth member 11 to receive the outer teeth member 11; a first elastic member 13 which is provided between the outer teeth member 11 and the inner teeth member 12 to be pressure-abutted on the outer teeth member 11 and the inner teeth member 12, and which is arranged to transmit the rotation force of the motor shaft 4a that is transmitted through the outer teeth member 11, to the inner teeth member 12; and a second elastic member 14 which is mounted with the first elastic member 14, and which is arranged to transmit the rotation force of the motor shaft 4a to the inner teeth member 12. In this embodiment, the elastic member disposed between the outer teeth member 11 and the inner teeth member 12 is constituted by two elastic members of the first elastic member 13 and the second elastic member 14. An end portion of the second elastic member 14 on the worm shaft 7 side is pressed against the inner teeth member 12.

As shown in FIG. 4, FIG. 5 and so on, the outer teeth member 11 includes an outer teeth member base portion 110 (first coupling base portion) which has a substantially cylindrical shape, which includes a through hole 11a formed at a central portion of the outer teeth member 11, and which is press-fit and fixed through the through hole 11a on the outer circumference of the tip end portion of the motor shaft 4a of the electric motor 4; and first outer blade portion 110a to sixth outer blade portion 110f which are provided on an outer circumference of the outer teeth member base portion 110 in the circumferential direction, and which protrude, respectively, in radially outward directions with respect to a first axis P1 that is a rotation axis of the motor shaft 4a. As shown in FIG. 3, a first shaft member assembly 20 is constituted by a combination of the outer teeth member 11 (the first coupling member) and the motor shaft 4a (the first shaft member).

As shown in FIG. 4, FIG. 5 and so on, the inner teeth member 12 includes an inner teeth member base portion 120 (second coupling base portion) which has a substantially cylindrical shape, which includes a through hole 12a formed at a central portion of the inner teeth member 12, and which is press-fit and fixed through the through hole 12a on the outer circumference of the first end portion of the worm shaft 7; and first inner blade portion 120a to sixth inner blade portion 120f which are provided on an inner circumference of the inner teeth member base portion 120 in the circumferential direction, and which protrude, respectively, in radially inward directions with respect to a second axis P2 which is a rotation axis of the worm shaft 7. As shown in FIG. 3, a second shaft member assembly 21 is constituted by a combination of the inner teeth member 12 (the second coupling member) and the worm shaft 7 (the second shaft member).

In this embodiment, the first shaft member assembly 20 is constituted by the combination of the outer teeth member 11 (the first coupling member) and the motor shaft 4a (the first shaft member). The second shaft member assembly 21 is constituted by the combination of the inner teeth member 11 (the second coupling member) and the worm shaft 7 (the second shaft member). However, the first shaft member assembly 20 and the second shaft member assembly 21 are not limited to these combinations. For example, the first shaft member assembly 20 may be constituted by a combination of the outer teeth member 11 and the worm shaft 7. The second shaft member assembly 21 may be constituted by a combination of the inner teeth member 12 and the motor shaft 4a.

Figure 6A:
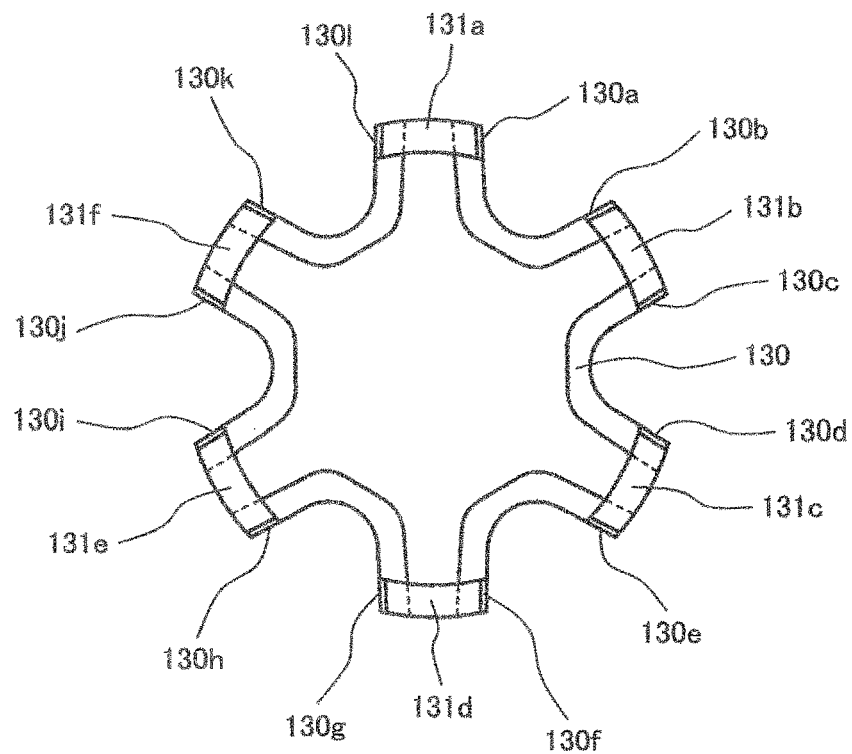
FIG. 6A is a front view showing a first elastic member 13 according to the first embodiment of the present invention when viewed from a base portion 120 (second coupling base portion) side.
Figure 6B:
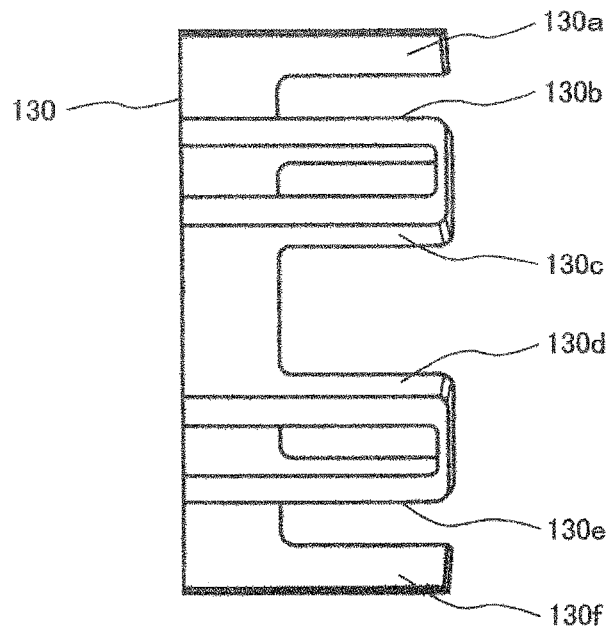
FIG. 6B is a side view showing the first elastic member 13 according to the first embodiment of the present invention.

A configuration of the first elastic member 13 is explained with reference to FIG. 6A and FIG. 6B. FIG. 6A is a front view showing the first elastic member 13 in the first embodiment of the present invention, when viewed from the inner teeth member 12 (the second coupling member) side. FIG. 6B is a side view showing the first elastic member 13 in the first embodiment of the present invention.

The first elastic member 13 is made from resin material. As shown in FIG. 6A, 6B and so on, the first elastic member 13 includes an elastic member base portion 130 having a substantially disc shape; and first elastic portion 130a to twelfth elastic portion 130l extending, respectively, from the elastic member base portion 130 in the radially outward directions. The resin material includes elastomer, synthetic resin, rubber (natural rubber and synthetic rubber), and so on. Moreover ,the first elastic portion 130a to twelfth elastic portion 130l extend, respectively, in the axial direction of the motor shaft 4a. The first elastic member 13 includes first opening portion 131a to sixth opening portion 131f which are formed, respectively, between adjacent two of the first elastic portion 130a to twelfth elastic portion 130l.

The first elastic member 13 is disposed to cover the outer teeth member 11. The first opening portion 131a to the sixth opening portion 131f formed between adjacent two of the elastic portions are aligned with the first outer blade portion 110a to the sixth outer blade portion 110f of the outer teeth member 11. Then, the first outer blade portion 110a to the sixth outer blade portion 110f of the outer teeth member 11 are inserted, respectively, to the first opening portion 131a to the sixth opening portion 131f.

Figure 7A:
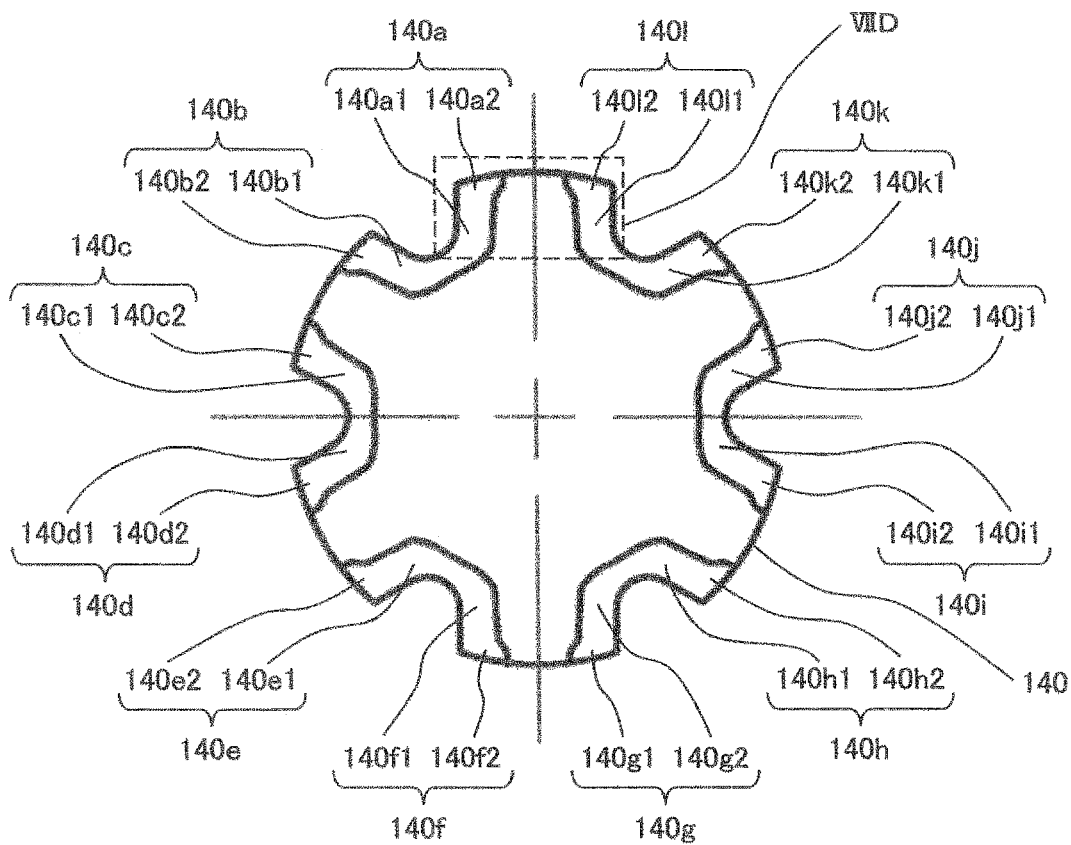
FIG. 7A is a front view showing a second elastic member 14 according to the first embodiment of the present invention when viewed from an outer teeth member 11 (first coupling member) side.
Figure 7B:
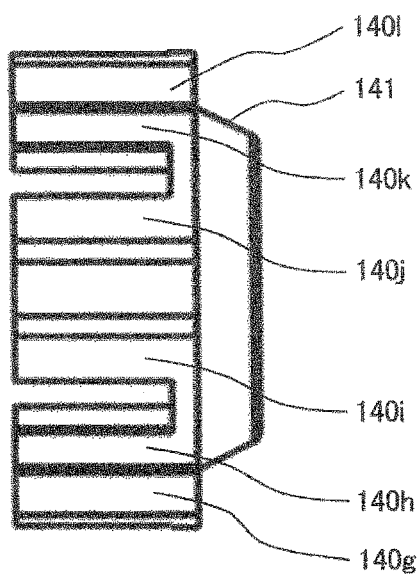
FIG. 7B is a side view showing the second elastic member 14 according to the first embodiment of the present invention.
Figure 7C:
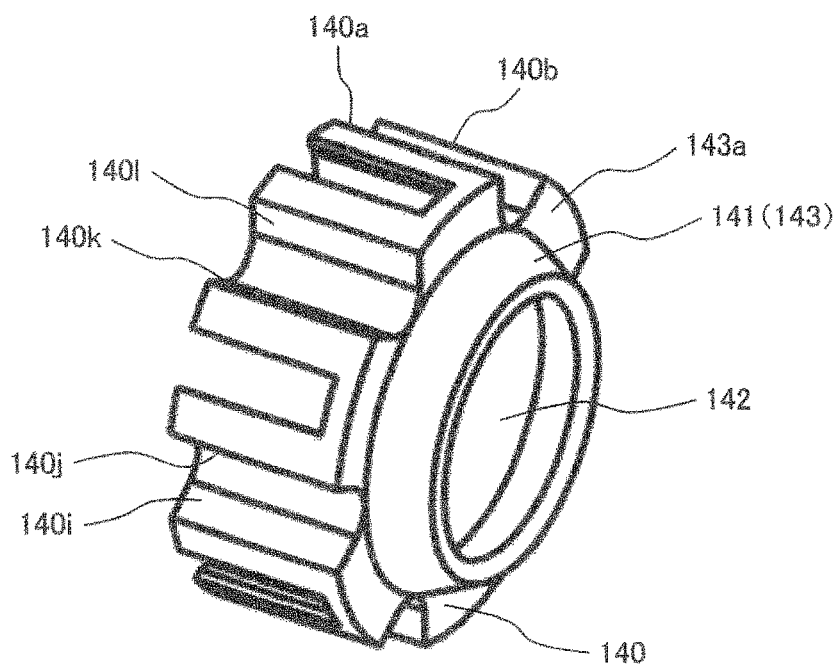
FIG. 7C is a perspective view showing the second elastic member 14 according to the first embodiment of the present invention when viewed from an inner teeth member 12 (second coupling member) side.
Figure 7D:
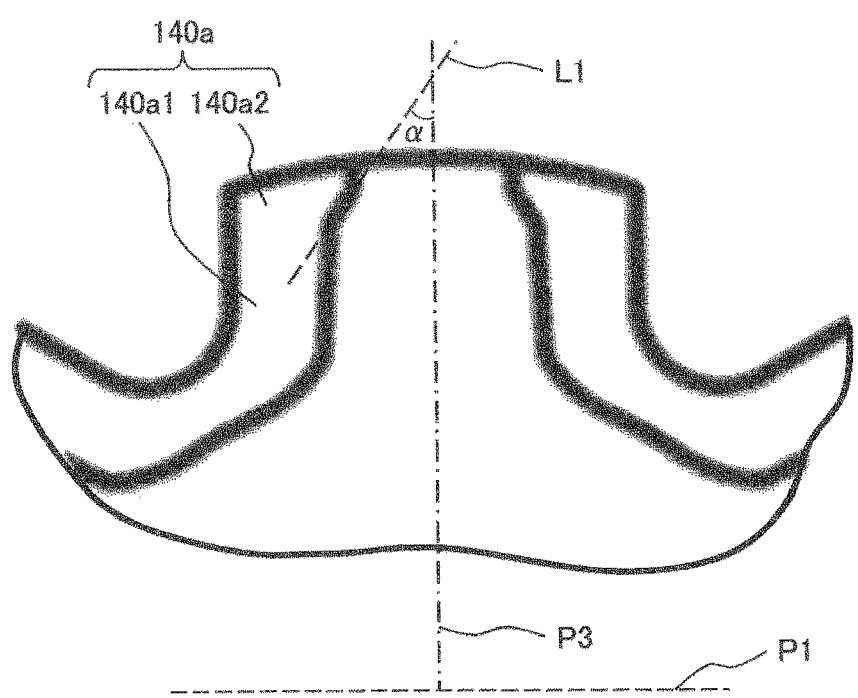
FIG. 7D is an enlarged view showing a VII portion in FIG. 7A.

Next, a configuration of the second elastic member 14 is explained with reference to FIG. 7A to FIG. 7D. FIG. 7A is a front view showing the second elastic member 14 in the first embodiment of the present invention when viewed from the outer teeth member 11 (the first coupling member) side. FIG. 7B is a side view showing the second elastic member 14 in the first embodiment of the present invention. FIG. 7C is a perspective view showing the second elastic member 14 in the first embodiment of the present invention when viewed from the inner teeth member 12 (the second coupling member) side. FIG. 7D is an enlarged view showing a VII portion in FIG. 7A.

The second elastic member 14 is made from resin material. As shown in FIG. 7A, FIG. 7B, FIG. 7C and so on, the second elastic member 14 includes an elastic member base portion 140 having a substantially disc shape; first rotation direction elastic portion 140a to twelfth rotation direction elastic portion 140l extending, respectively, from the elastic member base portion 140 in the radially outward direction; and an axial elastic portion 141 provided to the elastic member base portion 140. The resin material includes elastomer, synthetic resin, rubber (natural rubber and synthetic rubber), and so on. Adjacent two of the first rotation direction elastic portion 140a to the twelfth rotation direction elastic portion 140l (for example, first and second rotation direction elastic portions 140a and 140b, third and fourth rotation direction elastic portions 140c and 140d) are formed to have an U-shape. The axial elastic portion 141 has an annular shape. The axial elastic portion 141 is provided to the elastic member base portion 140.

The first rotation direction elastic portion 140a, the second rotation direction elastic portion 140b, the third elastic rotation direction elastic portion 140c, and the fourth rotation direction elastic portion 140e include, respectively, rotation direction elastic portion main body portion 140a1, 140b1, 140c1, and 140d1, and rotation direction elastic portion protruding portions 140a2, 140b2, 140c2, and 140d2.

Similarly, the fifth rotation direction elastic portion 140e to the twelfth rotation direction elastic portion 140l include, respectively, rotation direction elastic portion main body portions 140e1 to 140l1, and rotation direction elastic portion protruding portions 140e2 to 140l2.

In a state where the second elastic member 14 is assembled between the first shaft member assembly 20 and the second shaft member assembly 21, the rotation direction elastic portion main body portions 140a1 to 140d1 are provided to be apart, respectively, from the first outer blade portion 110a, the second outer blade portion 110b, and the third outer blade portion 110c in the circumferential direction with respect to the first axis P1, in a no load state where the torque is not transmitted from the first shaft member assembly 20 to the second shaft member assembly 21. Similarly, the rotation direction elastic portion main body portions 140e1 to 140l1 are provided to be apart, respectively, from the fourth outer blade portion 110d to sixth outer blade portion 110f in the circumferential direction, in the no load state.

Moreover, in a state where the second elastic member 14 is assembled between the first shaft member assembly 20 and the second shaft member assembly 21, the rotation direction elastic portion protruding portions 140a2 to 140d2 are provided to the rotation direction elastic portion main body portions 140a1 to 140d1 to protrude toward the first outer blade portion 110a, the second outer blade portion 110b, and the third outer blade portion 110c. In the no load state, the rotation direction elastic portion protruding portions 140a2 to 140d2 are abutted, respectively, on the first outer blade portion 110a, the second outer blade portion 110b, and the third outer blade portion 110c. Similarly, the rotation direction elastic portion protruding portions 140e2 to 140l2 are abutted, respectively, on the third outer blade portion 110c to the sixth outer blade portion 110f, and the first outer blade portion 110a in the no load state.

The rotation direction elastic portion protruding portions 140a2 to 140l2 are provided outside the rotation direction elastic portion main body portions 140a1 to 140l1 in the radial direction with respect to the first axis P1.

By this embodiment, it is also possible to decrease the rigidity of the elastic portion in the rotational direction. Accordingly, it is possible to suppress the influence (the vibration, the torque variation, and so on) on the worm gear (the worm wheel and the worm shaft) due to the misalignment (deviation) of the axes of the first shaft member assembly and the second shaft member assembly.

Moreover, in this embodiment, the moment arm of the rotation direction elastic portion protruding portion becomes long. Accordingly, it is possible to transmit larger rotation torque in the rotation direction elastic portions. Consequently, it is possible to transmit the rotation torque in wider range by the rotation direction elastic portion protruding portions having the low rigidity.

A configuration of the rotation direction elastic portion protruding portion is explained with reference to FIG. 7D. In below-explanations, the rotation direction elastic portion protruding portion 140a2 of the first rotation direction elastic portion 140a is explained. The rotation direction elastic portion protruding portions 140b2 to 140l2 have configuration identical to those of the rotation direction elastic portion protruding portion 140a2.

In FIG. 7D, a third line P3 is defined by a line which divides the first rotation direction elastic portion 140a into equal portions in the circumferential direction with respect to the first axis P1, and which is perpendicular to the first axis P1. L1 is defined by an extension line which is tangent to an inside surface of the rotation direction elastic portion protruding portion 140a2 in the radial direction. The rotation direction elastic portion protruding portion 140a2 is formed so that an angle a sandwiched by the third line P3 and the extension line L1 which is the inside surface in the radial direction with respect to the first axis P1 is an acute angle. In this embodiment, it is possible to suppress the bending deformation when the rotation direction elastic portion protruding portion receives the force from the outer blade portion. That is, the rotation direction elastic portion protruding portion is deformed to be compressed in the circumferential direction. With this, it is possible to transmit larger rotation torque in the rotation direction elastic portion.

The first elastic member 13 and the second elastic member 14 which are two elastic members are constituted so that the first elastic member 13 and the second elastic member 14 are combined with each other. The first and second elastic members 13 and 14 are combined so that respective surfaces of the first elastic portion 130a to the twelfth elastic portion 130l of the first elastic member 13 confront respective surfaces of the first rotation direction elastic portion 140a to the twelfth rotation direction elastic portion 140l of the second elastic member 14. With this, the combination of the first elastic member 13 and the second elastic member 14 are completed so as to serve as the elastic member disposed between the outer teeth member 11 (the first coupling member) and the inner teeth member 12 (the second coupling member).

Next, the combination state of the outer teeth member 11 (the first coupling member), the inner teeth member 12 (the second coupling member), the elastic member 30 (the first elastic member 13 and the second elastic member 14) are explained with reference to FIG. 4 and FIG. 5.

The outer teeth member 11 (the first coupling member) includes the outer teeth member base portion 110 (the first coupling base portion) and the first outer blade portion 110a to the sixth outer blade portion 110f. The outer teeth member base portion 110 is provided to the motor shaft 4a (the first shaft member). The first outer blade portion 110a is provided to the outer teeth member base portion 110. The first outer blade portion 110a protrudes in the radially outward direction with respect to the first axis P1 which is the rotation axis of the motor shaft 4a. The second outer blade portion 110b is provided to the outer teeth member base portion 110. The second outer blade portion 110b protrudes in the radially outward direction with respect to the first axis P1. The third outer blade portion 110c is provided to the outer teeth member base portion 110. The third outer blade portion 110c protrudes in the radially outward direction with respect to the first axis P1. The fourth outer blade portion 110d, the fifth outer blade portion 110e, and the sixth outer blade portion 110f have identical configurations.

The inner teeth member 12 (the second coupling member) includes the inner teeth member base portion 120 (the second coupling base portion) and the first inner blade portion 120a to the sixth inner blade portion 120f. The inner teeth member base portion 120 is provided to the worm shaft 7 (the second shaft member). The first inner blade portion 120a is provided to the inner teeth member base portion 120. The first inner blade portion 120a protrudes in the radially inward direction with respect to the second axis P2 which is the rotation axis of the worm shaft 7. The first inner blade portion 120a is provided between the first outer blade portion 110a and the second outer blade portion 110b in the circumferential direction with respect to the first axis P1. The second inner blade portion 120b is provided to the inner teeth member base portion 120. The second inner blade portion 120b protrudes in the radially inward direction with respect to the second axis P2. The second inner blade portion 120b is provided between the second outer blade portion 110b and the third outer blade portion 110c in the circumferential direction with respect to the first axis P1. The third inner blade portion 120c, the fourth inner blade portion 120d, the fifth inner blade portion 120e, and the sixth inner blade portion 120f have the identical configurations.

As described above, the second elastic member 14 which is the elastic member is made from the resin material. The second elastic member 14 includes the elastic member base portion 140; the first rotation direction elastic portion 140a to the twelfth rotation direction elastic portion 140l; and the axial elastic portion 141 which has an annular shape, and which is provided to the elastic member base portion 140. As shown in FIG. 4, the elastic member base portion 140 is provided between the first shaft member assembly 20 and the second shaft member assembly 21 in the direction of the first axis P1.

The first rotation direction elastic portion 140a provided to the elastic member base portion 140 is provided between the first outer blade portion 110a and the first inner blade portion 120a in the circumferential direction with respect to the first axis P1. The second rotation direction elastic portion 140b is provided between the second outer blade portion 110b and the first inner blade portion 120a in the circumferential direction with respect to the first axis P1. The third rotation direction elastic portion 140c is provided between the second outer blade portion 110b and the second inner blade portion 120b in the circumferential direction with respect to the first axis P1. The fourth rotation direction elastic portion 140d is provided between the third outer blade portion 110c and the second inner blade portion 120b in the circumferential direction with respect to the first axis P1.

The fifth rotation direction elastic portion 140e provided to the elastic member base portion 140 is provided between the third outer blade portion 110c and the third inner blade portion 120c in the circumferential direction with respect to the first axis P1. The sixth rotation direction elastic portion 140f is provided between the fourth outer blade portion 110d and the third inner blade portion 120c in the circumferential direction with respect to the first axis P1.

The seventh rotation direction elastic portion 140g provided to the elastic member base portion 140 is provided between the fourth outer blade portion 110d and the fourth inner blade portion 120d in the circumferential direction with respect to the first axis P1. The eighth rotation direction elastic portion 140h is provided between the fifth outer blade portion 110e and the fourth inner blade portion 120d in the circumferential direction with respect to the first axis P1.

The ninth rotation direction elastic portion 140i provided to the elastic member base portion 140 is provided between the fifth outer blade portion 110e and the fifth inner blade portion 120e in the circumferential direction with respect to the first axis P1. The tenth rotation direction elastic portion 140j is provided between the sixth outer blade portion 110f and the fifth inner blade portion 120e in the circumferential direction with respect to the first axis P1.

The eleventh rotation direction elastic portion 140k provided to the elastic member base portion 140 is provided between the sixth outer blade portion 110f and the sixth inner blade portion 120f in the circumferential direction with respect to the first axis P1. The twelfth rotation direction elastic portion 140l is provided between the first outer blade portion 110a and the sixth inner blade portion 120f in the circumferential direction with respect to the first axis P1.

Figure 8A:
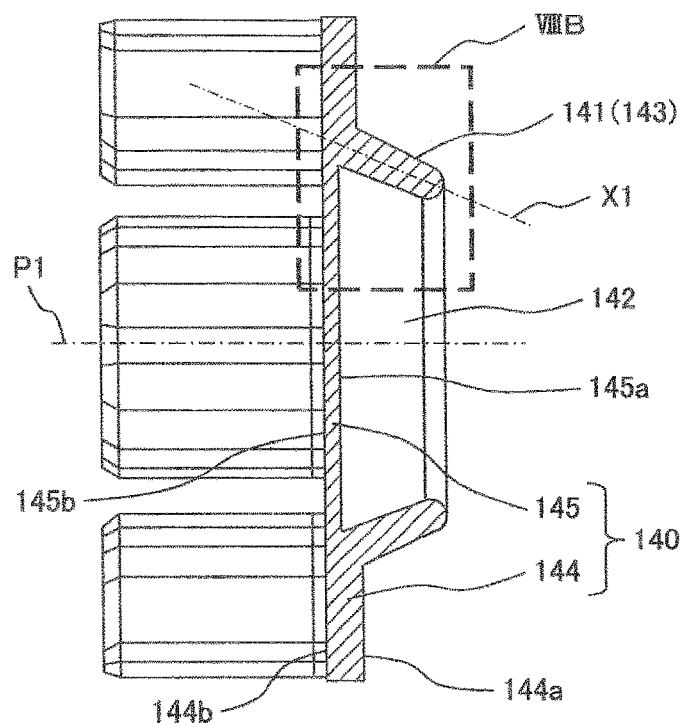
FIG. 8A is a sectional view taking along a first axis direction of an axial elastic portion 141 according to the first embodiment of the present invention.
Figure 8B:
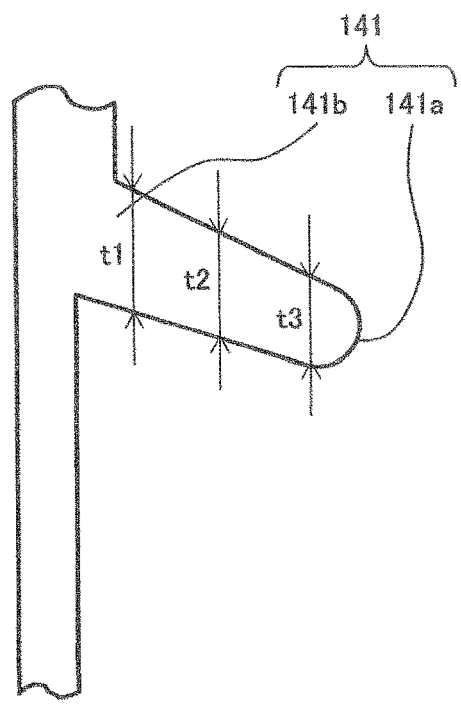
FIG. 8B is an enlarged view showing a VIIIB portion in FIG. 7A.

Next, configurations of the axial elastic portion 141 are explained with reference to FIG. 7C, FIG. 8A and FIG. 8B. FIG. 8A is a sectional view taken along the first axis direction of the axial elastic portion 141 according to the first embodiment of the present invention. FIG. 8B is an enlarged view showing a IIIB portion in FIG. 8A.

The axial elastic portion 141 is provided to the elastic member base portion 140. The axial elastic portion 141 protrudes in the direction of the first axis P1 from the motor shaft 4a (the first shaft member) side (left side in FIG. 8A) toward the worm shaft 7 (the second shaft member) side (right side in FIG. 8A). Moreover, the axial elastic portion 141 includes an axial elastic portion annular portion 143 surrounding the first axis P1. A space portion 142 is formed in a portion surrounded by the axial elastic portion annular portion 143. Moreover, the axial elastic portion 141 (the axial elastic portion annular portion 143) is inclined with respect to the first axis P1 so that the axial elastic portion 141 (the axial elastic portion annular portion 143) becomes closer to the first axis P1 in the direction of the first axis P1 from the elastic member base portion 140 toward the second axial member assembly 21. In this embodiment, the elastic member base portion 140 includes the axial elastic portion 141.

Conventionally, in a case where the outer teeth member and the inner teeth member are assembled, the elastic member disposed between the outer teeth member and the inner teeth member is pressed in the axial direction to be compressed and deformed. With this, a clearance between the outer teeth member and the inner teeth member is adjusted. The elastic member has the high rigidity. Accordingly, it is difficult to adjust the axial clearance, so that the misalignment between the motor shaft and the worm shaft to which the inner teeth member is attached is generated. Consequently, the vibration may be provided to the worm gear. The torque variation may be generated. Therefore, in this embodiment, the elastic member base portion 140 includes the axial elastic portion 141 arranged to decrease the rigidity relative to a case of the compressive deformation.

The axial elastic portion 141 is arranged to be bent and deformed in a direction in which the axial elastic portion 141 is inclined with respect to the first axis P1 when the clearance between the first shaft member assembly 20 and the second shaft member assembly 21 in the direction of the first axis P1 is decreased.

In this embodiment, the elastic member is made from the resin material. Accordingly, it is possible to ensure the wider region having the low rigidity, relative to a case where the elastic member is made from the metal material. Moreover, the axial elastic portion is arranged to generate the elastic force by the bending deformation. With this, it is possible to decrease the rigidity relative to the case of the compressive deformation. Accordingly, it is possible to suppress the influence (the vibration, the torque variation and so on) on the worm gear (the worm wheel and the worm shaft) at the driving of the electric motor, due to the misalignment of the axes of the first shaft member assembly and the second shaft member assembly.

Furthermore, the axial elastic portion 141 according to this embodiment is provided to the elastic member base portion 140. The axial elastic portion 141 protrudes in the direction of the first axis P1 from the motor shaft 4a (the first shaft member) toward the worm shaft 7 (the second shaft member). Accordingly, it is possible to attain the elastic force by the bending deformation by the simple configuration.

Moreover, the axial elastic portion 141 according to this embodiment includes the axial elastic portion annular portion 143 surrounding the first axis P1. In this embodiment, the axial elastic portion 141 has an annular shape. With this, the annular portion can generate the elastic force by the compression or the tension at the bending deformation. Consequently, it is possible to obtain the appropriate elastic force in the entire axial elastic portion.

As shown in FIG. 8A and FIG. 8B, the axial elastic portion 141 has a tapered shape in which the outside diameter of the axial elastic portion 141 is gradually decreased as the axial elastic portion 141 is closer in the direction of the first axis P1 from the motor shaft 4a (the first shaft member) toward the worm shaft 7 (the second shaft member). That is, an opening area of the space portion 142 is gradually decreased as the position of the space portion 142 is closer from the motor shaft 4a (the first shaft member) toward the worm shaft 7 (the second shaft member).

By the above-described configuration, when the force to decrease the axial clearance between the first shaft member assembly and the second shaft member assembly, and to decrease the axial size of the axial elastic portion is received, the diameter of the annular portion in the axial elastic portion is decreased, so that the axial elastic portion is compressed and deformed in the circumferential direction. On the other hand, in a case of the taper shape in which the annular portion is inclined to be wider, the annular portion receives the pulling force (the tension force) at the deformation of the axial elastic portion. Accordingly, the possibility of the generation of the damage such as the crack is increased.

Moreover, the elastic member base portion 140 of the second elastic member 14 includes an elastic member base portion main body portion 144 and an elastic member base portion bottom portion 145. The elastic member base portion main body portion 144 is provided outside the axial elastic portion annular portion 143 in the radial direction with respect to the first axis Pl.

The elastic member base portion bottom portion 145 is provided inside the axial elastic portion annular portion 143 in the radial direction with respect to the first axis P1. The elastic member base portion bottom portion 145 has a plate shape perpendicular to the first axis P1. By this embodiment, the elastic member base portion bottom portion closes the inside of the axial elastic portion annular portion. Accordingly, it is possible to improve the rigidity of the axial elastic portion annular portion.

The elastic member base portion main body portion 144 has a plate shape perpendicular to the first axis P1, similarly to the elastic member base portion bottom portion 145. The elastic member base portion main body portion 144 includes an elastic member base portion main body portion first end surface 144a and an elastic member base portion main body portion second end surface 144b which are a pair of end surfaces in the direction of the first axis P1. The elastic member base portion main body portion first end surface 144a is closer to the worm shaft 7 (the second shaft member). The elastic member base portion main body portion second end surface 144b is provided on a side opposite to the elastic member base portion main body portion first end surface 144a.

The elastic member base portion bottom portion 145 includes an elastic member base portion bottom portion first end surface 145a and an elastic member base portion bottom portion second end surface 145b which are a pair of end surfaces in the direction of the first axis P1. The elastic member base portion bottom portion first end surface 145a is closer to the worm shaft 7 (the second shaft member). The elastic member base portion bottom portion second end surface 145b is provided on a side opposite to the elastic member base portion bottom portion first end surface 145a.

The elastic member base portion bottom portion first end surface 145a is farther from the worm shaft 7 (the second shaft member) in the direction of the first axis P1 than the elastic member base portion main body portion first end surface 144a. That is, the elastic member base portion bottom portion first end surface 145a is recessed from the elastic member base portion main body portion first end surface 144a toward the motor shaft 4a (the first shaft member) side. Moreover, that is, the elastic member base portion bottom portion 145 has a plate thickness smaller than a plate thickness of the elastic member base portion main body portion 144. In this embodiment, the elastic member base portion bottom portion first end surface is provided at a position (recessed position) deeper than the elastic member base portion main body portion first end surface. Accordingly, when the axial elastic portion annular portion is bent and deformed to be fallen down inwards, it is possible to relieve the internal stress on the inner circumference side of the axial elastic portion base portion.

The axial elastic portion 141 includes an axial elastic portion tip end portion 141a which has an arc shape in a section passing through the first axis P1, and which is abutted on the second shaft member assembly 21. The axial elastic portion 141 protrude from the axial elastic portion base portion 141b adjacent to the elastic member base portion 140, toward the axial elastic portion tip end portion 141a. By this embodiment, a portion at which the axial elastic portion tip end portion is abutted on the first shaft member assembly is moved (varied) in accordance with the bending deformation of the axial elastic portion. On the other hand, this axial elastic portion tip end portion has the arc shape. Accordingly, the sliding movement of the axial elastic portion tip end portion with respect to the first shaft member assembly is smoothly performed. Consequently, it is possible to suppress the influence (the vibration, the torque variation and so on) on the worm gear (the worm wheel and the worm shaft) at the driving of the electric motor.

The thickness of the axial elastic portion 141 which is perpendicular to the first axis P1 is gradually decreased from the axial elastic portion base portion 141b adjacent to the elastic member base portion 140, toward the axial elastic portion tip end portion 141a abutted on the second shaft member assembly 21, in a section passing through the first axis P1. That is, a relationship among t1, t2, and t3 satisfies $t1>t2>t3$ where t1 is a thickness of the axial elastic portion base portion 141b which is perpendicular to the first axis P1, t3 is a thickness of the axial elastic portion tip end portion 141a which is perpendicular to the first axis P1, and t2 is a thickness of a middle portion of the axial elastic portion base portion 141b and the axial elastic portion tip end portion 141a. The thickness of the axial elastic portion 141 is largest at the axial elastic portion base portion 141b. The thickness of the axial elastic portion 141 is smallest at the axial elastic portion tip end portion 141a. In this embodiment, the axial elastic portion has a cantilever shape when viewed in the section passing through the first axis. Accordingly, it is possible to relieve (decrease) the stress concentration at the axial elastic portion at the bending is deformation of the axial elastic portion, by increasing the thickness of the axial elastic portion base portion, and by decreasing the thickness of the axial elastic portion tip end portion.

Moreover, X1 is defined in FIG. 8A by a line connecting the axial elastic portion base portion 141b and the axial elastic portion tip end portion 141a. In this embodiment, the line X1 is inclined with respect to the first axis P1. In this embodiment, the elastic member is made from the resin material. Accordingly, it is possible to widen the region having the low rigidity, relative to a case where the elastic member is made from the metal material. Furthermore, in the axial elastic portion, the line X1 connecting the axial elastic portion base portion and the axial elastic portion tip end portion is inclined with respect to the first axis. Accordingly, the axial elastic portion can generate the elastic force by the bending deformation. Consequently, it is further decease the rigidity, relative to the case of the compressive deformation. Therefore, it is possible to suppress the influence (the vibration, the torque variation, and so on) on the worm gear (the worm wheel and the worm shaft) at the driving of the electric motor, due to the misalignment of the axes of the first axis member assembly and the second axis member assembly.

Second Embodiment

Figure 9A:
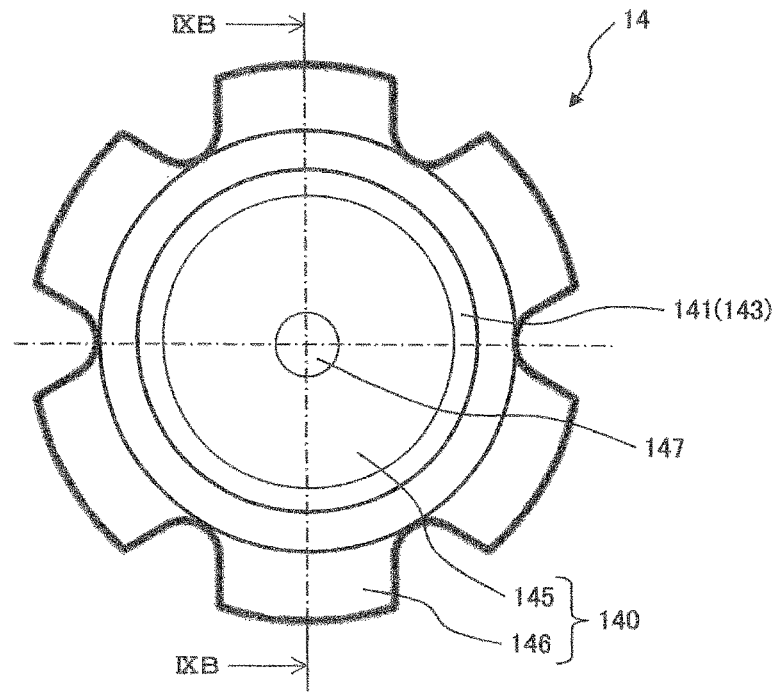
FIG. 9A is a front view showing a second elastic member according to a second embodiment of the present invention.
Figure 9B:
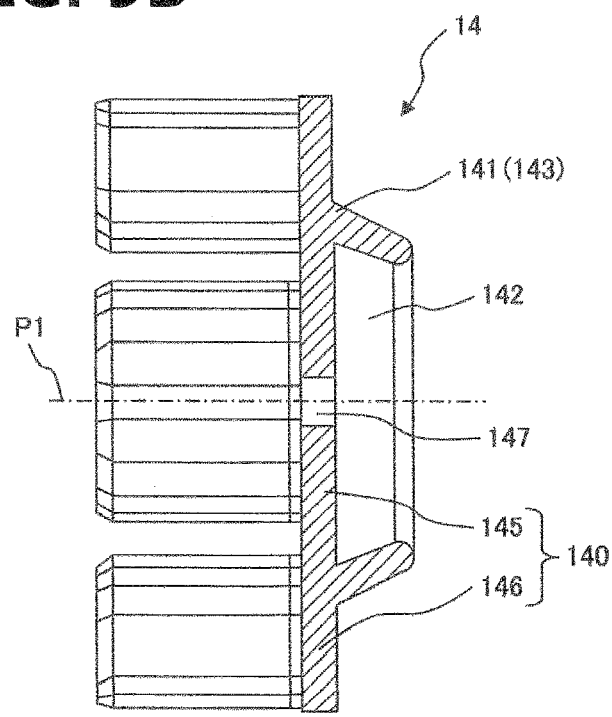
FIG. 9B is a sectional view taken along a section line IXB-IXB in FIG. 9A.

Next, a second embodiment of the present invention is explained with reference to FIG. 9A and FIG. 9B. FIG. 9A is a front view showing a second elastic member 14 according to the second embodiment of the present invention. FIG. 9B is a sectional view taken along a section line IXB-IXB in FIG. 9A. The steering device according to the second embodiment is substantially identical to the device according to the first embodiment in most aspects as shown by the use of the same reference numerals. The repetitive explanations are omitted.

As explained in the first embodiment, the axial elastic portion 141 is abutted on the second shaft member assembly 21. The axial elastic portion 141 has the annular shape. The axial elastic portion 141 is provided to the elastic member base portion 140. Accordingly, when the axial elastic portion 141 is abutted on the second shaft member assembly 21 (cf. FIG. 4), the air is trapped within the space portion 142. The elastic characteristics of the second elastic member 14 may be varied by the trapped air. Means for solving this problem are explained below. In this embodiment, the elastic member base portion bottom portion 145 includes a through hole 147 penetrating through the elastic member base portion bottom portion 145 in the direction of the first axis P1. One through hole 147 is formed at a substantially central portion of the elastic member base portion bottom portion 145. Number of the through hole 147 is limited to one. There may be provided a plurality of through holes 147. Moreover, the position of the through hole 147 is not limited to the central portion. It is optional to arbitrarily select the position of the through hole 147.

When the axial elastic portion 141 and the second shaft member assembly 21 are abutted on each other, the air within the space portion 142 can be moved through the through hole 147 to the first shaft member assembly 20 side. By this embodiment, it is possible to suppress the variation of the elastic characteristics of the elastic member due to the air trapped within the elastic member.

A steering device includes:

a rack bar which includes a rack teeth portion, and which is arranged to turn steered wheels;

a pinion shaft including a pinion teeth portion arranged to be engaged with the rack teeth portion of the rack bar;

a worm wheel (8) which is arranged to rotate as a unit with the pinion shaft, and which includes a wheel teeth portion (8a);

a worm shaft (7) including a worm teeth portion (7a) arranged to be engaged with the wheel teeth portion (8a) of the worm wheel (8);

an electric motor (4) which includes a motor shaft (4a), and which is arranged to rotate the worm shaft (7);

a coupling (10) including a first coupling member (outer teeth member 11), a second coupling member (inner teeth member 12), and an elastic member (30), a first shaft member being one of the worm shaft (7) and the motor shaft (4a);

a second shaft member being the other of the worm shaft (7) and the motor shaft (4a);

a first shaft member assembly (20) including the first shaft member and the first coupling member (outer teeth member 11);

a second shaft member assembly (21) including the second shaft member and the second coupling member (inner teeth member 12);

the first coupling member (outer teeth member 11) including a first coupling base portion (outer teeth member base portion 110), a first outer blade portion (110a), a second outer blade portion (110b), and a third outer blade portion (110c), the first coupling base portion (outer teeth member base portion 110) provided to the first shaft member (motor shaft 4a), the first outer blade portion (110a) which is provided to the first coupling base portion (outer teeth member base portion 110), and which protrudes in a radially outward direction with respect to a first axis (P1) which is a rotation axis of the first shaft member (motor shaft 4a), the second outer blade portion (110b) which is provided to the first coupling base portion (outer teeth member base portion 110), and which protrudes in the radially outward direction with respect to the first axis (P1), the third outer blade portion (110c) which is provided to the first coupling base portion (outer teeth member base portion 110), and which protrudes in the radially outward direction with respect to the first axis (P1), the second coupling member (inner teeth member 12) including a second coupling base portion (inner teeth member base portion 120), a first inner blade portion (120a), and a second inner blade portion (120b), the second coupling base portion (inner teeth member base portion 120) provided to the second shaft member (worm shaft 7), the first inner blade portion (120a) which is provided to the second coupling base portion (inner teeth member base portion 120), which protrudes in a radially inward direction with respect to a second axis (P2) that is a rotation axis of the second shaft member (worm shaft 7), and which is provided between the first outer blade portion (110a) and the second outer blade portion (110b) in a circumferential direction with respect to the first axis (P1), the second inner blade portion (120b) which is provided to the second coupling base portion (inner teeth member base portion 120), which protrudes in the radially inward direction with respect to the second axis (P2), and which is provided between the second outer blade portion (110b) and the third outer blade portion (110c) in a circumferential direction with respect to the second axis (P2), the elastic member (30) which is made from a resin, and which includes an elastic member base portion (140), a first rotation direction elastic portion (140a), a second rotation direction elastic portion (140b), a third rotation direction elastic portion (140c), a fourth rotation elastic portion (140d), and an axial elastic portion (141), the elastic member base portion (140) which is provided between the first shaft member assembly (20) and the second shaft member assembly (21) in a direction of the first axis (P1), the first rotation direction elastic portion (140a) which is provided to the elastic member base portion (140), and which is provided between the first outer blade portion (110a) and the first inner blade portion (120a) in the circumferential direction with respect to the first axis (P1), the second rotation direction elastic portion (140b) which is provided to the elastic member base portion (140), and which is provided between the second outer blade portion (110b) and the first inner blade portion (120a) in the circumferential direction with respect to the first axis (P1), the third rotation direction elastic portion (140c) which is provided to the elastic member base portion (140), and which is provided between the second outer blade portion (110b) and the second inner blade portion (120b) in the circumferential direction with respect to the first axis (P1), the fourth rotation direction elastic portion (140d) which is provided to the elastic member base portion (140), and which is provided between the third outer blade portion (110*c*) and the second inner blade portion (120*b*) in the circumferential direction with respect to the first axis (P1), and the axial elastic portion (141) which is provided to the elastic member base portion (140), and which is arranged to be bent in a direction to be inclined with respect to the first axis (P1) when a clearance between the first shaft member assembly (20) and the second shaft member assembly (21) in the direction of the first axis (P1) is decreased.

In this aspect, the elastic member is made from the resin material. Accordingly, it is possible to ensure the wide region having the low rigidity, relative to a case where the elastic member is made from the metal material. Moreover, the axial elastic portion is arranged to generate the elastic force by the bending deformation. Consequently, it is possible to further decrease the rigidity, relative to the compressive deformation. Therefore, it is possible to suppress the influence (the vibration, the torque variation and so on) on the worm gear (the worm wheel and the worm shaft) at the driving of the electric motor due to the misalignment of the axes of the first shaft member assembly and the second shaft member assembly.

In a preferred aspect, the axial elastic portion (141) protrudes in the direction of the first axis (P1) from the first shaft member toward the second shaft member.

In this aspect, it is possible to generate the elastic force by the bending deformation by the simple configuration.

In a preferred aspect, the axial elastic portion (141) includes an axial elastic portion annular portion (143) surrounding the first axis (P1).

In this aspect, the axial elastic portion has the annular shape. With this, the annular portion can generate the elastic force by the compression or the tension at the bending deformation. Accordingly, it is possible to obtain the appropriate elastic force in the entire axial elastic portion.

In a preferred aspect, the axial elastic portion annular portion (143) is provided to an axial elastic portion tip end portion (141*a*) abutted on the first axial member assembly.

In this aspect, a portion of the axial elastic portion which is abutted on the first shaft member assembly has the annular shape. Accordingly, the entire circumference of the axial elastic portion can be abutted on the first shaft member assembly. Consequently, it is possible to generate the appropriate elastic force with respect to the relative falling between the first shaft member assembly and the second shaft member assembly, dependently of the falling direction.

In a preferred aspect, the axial elastic portion (141) has a tapered shape in which an outside diameter with respect to the first axis (P1) is gradually decreased in the direction of the first axis (P1) from the first shaft member (motor shaft 4*a*) side toward the second shaft member (worm shaft 7) side.

In this aspect, when the force to decrease the axial clearance between the first shaft member assembly and the second shaft member assembly, and to decrease the axial size of the axial elastic portion is applied, in the axial elastic portion, the diameter of the annular portion is decreased, and the axial elastic portion is compressed and deformed in the circumferential direction. Accordingly, it is possible to improve the durability of the annular portion. On the other hand, in case of the tapered shape in which the annular portion is inclined in the widening direction, the annular portion receives the tension force at the deformation of the axial elastic portion. Consequently, the possibility of the generation of the damage such as the crack is increased.

In a preferred aspect, the elastic member base portion (140) includes an elastic member base portion main body portion (144) and an elastic member base portion bottom portion (145); the elastic member base portion main body portion (144) is provided outside the axial elastic portion annular portion (143) in a radial direction with respect to the first axis (P1); the elastic member base portion bottom portion (145) is provided inside the axial elastic portion annular portion (143) in the radial direction with respect to the first axis (P1); and the elastic member base portion bottom portion (145) has a plate shape perpendicular to the first axis (P1).

In this aspect, the inside of the axial elastic portion annular portion is closed by the elastic member base portion bottom portion. Accordingly, it is possible to improve the rigidity of the axial elastic portion annular portion.

In a preferred aspect, the elastic member base portion main body portion (144) has a plate shape perpendicular to the first axis (P1); the elastic member base portion main body portion (144) includes an elastic member base portion main body portion first end surface (144*a*) and an elastic member base portion main body portion second end surface (144*b*) which are a pair of end surfaces in the direction of the first axis (P1); the elastic member base portion main body portion first end surface (144*a*) is closer to the second shaft member (worm shaft 7) than the elastic member base portion main body portion second end surface (144*b*); the elastic member base portion main body portion second end surface (144*b*) is provided on a side opposite to the elastic member base portion main body portion first end surface (144*a*);

the elastic member base portion bottom portion (145) includes an elastic member base portion bottom portion first end surface (145*a*) and an elastic member base portion bottom portion second end surface (145*b*) which are a pair of end surfaces in the direction of the first axis (P1); the elastic member base portion bottom portion first end surface (145*a*) is closer to the second shaft member (worm shaft 7) than the elastic member base portion bottom portion second end surface (145*b*); the elastic member base portion bottom portion second end surface (145*b*) is provided on a side opposite to the elastic member base portion bottom portion first end surface (145*b*); and the elastic member base portion bottom portion first end surface (145*a*) is provided at a position farther from the second shaft member (worm shaft 7) than the elastic member base portion main body portion first end surface (144*a*) in the direction of the first axis (P1).

In this aspect, the elastic member base portion bottom portion first end surface is provided at a position (recessed position) deeper than the elastic member base portion main body portion first end surface. Accordingly, when the axial elastic portion annular portion is bent and deformed to be fallen down inwards, it is possible to relieve the internal stress on the inner circumference side of the axial elastic portion base portion.

In a preferred aspect, the elastic member base portion bottom portion (145) includes a through hole (147) penetrating through the elastic member base portion bottom portion (145) in the direction of the first axis (P1).

In this aspect, it is possible to suppress the variation of the elastic characteristics of the elastic member due to the air trapped within the elastic member.

In a preferred aspect, the axial elastic portion (141) includes an axial elastic portion tip end portion (141*a*) abutted on the second shaft member assembly (21), and which has an arc shape in a section passing through the first axis (P1); and the axial elastic portion (141) protrudes from an axial elastic portion base portion (141b) adjacent to the elastic member base portion (140), toward the axial elastic portion tip end portion (141a).

In this aspect, a portion at which the axial elastic portion tip end portion is abutted on the first shaft member assembly is moved (varied) in accordance with the bending deformation of the axial elastic portion. On the other hand, this axial elastic portion tip end portion has the arc shape. Accordingly, the sliding movement of the axial elastic portion tip end portion with respect to the first shaft member assembly is smoothly performed. Consequently, it is possible to suppress the influence (the vibration, the torque variation and so on) on the worm gear (the worm wheel and the worm shaft) at the driving of the electric motor.

In a preferred aspect, a thickness of the axial elastic portion (141) in a direction perpendicular to the first axis (P1) in a section passing through the first axis (P1) is gradually decreased from an axial elastic portion base portion (141b) adjacent to the elastic member base portion, toward an axial elastic portion tip end portion (141a) abutted on the second shaft member assembly (21).

In this aspect, the axial elastic portion has a cantilever shape when viewed in the section passing through the first axis. Accordingly, it is possible to relieve (decrease) the stress concentration at the axial elastic portion at the bending deformation of the axial elastic portion, by increasing the thickness of the axial elastic portion base portion, and by decreasing the thickness of the axial elastic portion tip end portion.

In a preferred aspect, the first rotation direction elastic portion (140a), the second rotation direction elastic portion (140b), the third rotation direction elastic portion (140c), and the fourth rotation direction elastic portion (140c) includes, respectively, rotation direction elastic portion main body portions (140a1, 140b1, 140c1, 140d1), and rotation direction elastic portion protruding portions (140a2, 140b2, 140c2, 140d2); each of the rotation direction elastic portion main body portions (140a1, 140b1, 140c1, 140d1) is apart from the first outer blade portion (110a), the second outer blade portion (110b), and the third outer blade portion (110c) in the circumferential direction with respect to the first axis in a no load state where a torque is not transmitted from the first shaft member assembly (20) to the second shaft member assembly (21); and the rotation direction elastic portion protruding portions are provided to the rotation direction elastic portion main body portion; the rotation direction elastic portion protruding portions (140a2, 140b2, 140c2, 140d2) protrudes, respectively, toward the first outer blade portion (110a), the second outer blade portion (110b), and the third outer blade portion (110c); and the rotation direction elastic portion protruding portions (140a2, 140b2, 140c2, 140d2) are abutted on the first outer blade portion (110a), the second outer blade portion (110b), and the third outer blade portion (110c) in the no load state.

In this aspect, it is also possible to decrease the rigidity of the elastic portion in the rotational direction. Accordingly, it is possible to suppress the influence (the vibration, the torque variation, and so on) on the worm gear (the worm wheel and the worm shaft) due to the misalignment (deviation) of the axes of the first shaft member assembly and the second shaft member assembly.

In a preferred aspect, each of the rotation direction elastic portion protruding portion (140a2, 140b2, 140c2, 140d2) is provided outside one of the rotation direction elastic portion main body portions (140a1, 140b1, 140c1, 140d1) in a radial direction with respect to the first axis.

In this aspect, the moment arm of the rotation direction elastic portion protruding portion becomes long. Accordingly, it is possible to transmit larger rotation torque in the rotation direction elastic portions. Consequently, it is possible to transmit the rotation torque in wider range by the rotation direction elastic portion protruding portions having the low rigidity.

In a preferred embodiment, a third line (P3) is defined by a line which divides the first rotation direction elastic portion (140a) into equal portions in a circumferential direction with respect to the first axis (P1), and which is perpendicular to the first axis (P1); and the rotation direction elastic portion protruding portion (140a2) is formed so that an angle (a) sandwiched by the third line (P3) and an inside surface of the rotation direction elastic portion protruding portion (140a2) in the radial direction with respect to the first axis (P1) is an acute angle.

In this aspect, it is possible to suppress the bending deformation when the rotation direction elastic portion protruding portion receives the force from the outer blade portion. That is, the rotation direction elastic portion protruding portion is deformed to be compressed in the circumferential direction. With this, it is possible to transmit larger rotation torque in the rotation direction elastic portion.

In a preferred aspect, a steering device includes:
a rack bar which includes a rack teeth portion, and which is arranged to turn steered wheels;
a pinion shaft including a pinion teeth portion arranged to be engaged with the rack teeth portion of the rack bar;
a worm wheel (8) which is arranged to rotate as a unit with the pinion shaft, and which includes a wheel teeth portion (8a);
a worm shaft (7) including a worm teeth portion (7a) arranged to be engaged with the wheel teeth portion (8a) of the worm wheel (8);
an electric motor (4) which includes a motor shaft (4a), and which is arranged to rotate the worm shaft (7);
a coupling (10) including a first coupling member (outer teeth member 11), a second coupling member (inner teeth member 12), and an elastic member (30),
a first shaft member being one of the worm shaft (7) and the motor shaft (4a);
a second shaft member being the other of the worm shaft (7) and the motor shaft (4a);
a first shaft member assembly (20) including the first shaft member and the first coupling member (outer teeth member 11);
a second shaft member assembly (21) including the second shaft member and the second coupling member (inner teeth member 12);
the first coupling member (outer teeth member 11) including a first coupling base portion (outer teeth member base portion 110), a first outer blade portion (110a), a second outer blade portion (110b), and a third outer blade portion (110c),
the first coupling base portion (outer teeth member base portion 110) provided to the first shaft member (motor shaft 4a),
the first outer blade portion (110a) which is provided to the first coupling base portion (outer teeth member base portion 110), and which protrudes in a radially outward direction with respect to a first axis (P1) which is a rotation axis of the first shaft member (motor shaft 4a),
the second outer blade portion (110b) which is provided to the first coupling base portion (outer teeth member base portion 110), and which protrudes in the radially outward direction with respect to the first axis (P1), the third outer blade portion ($110c$) which is provided to the first coupling base portion (outer teeth member base portion $110$), and which protrudes in the radially outward direction with respect to the first axis (P1), the second coupling member (inner teeth member $12$) including a second coupling base portion (inner teeth member base portion $120$), a first inner blade portion ($120a$), and a second inner blade portion ($120b$), the second coupling base portion (inner teeth member base portion $120$) provided to the second shaft member (worm shaft $7$), the first inner blade portion ($120a$) which is provided to the second coupling base portion (inner teeth member base portion $120$), which protrudes in a radially inward direction with respect to a second axis (P2) that is a rotation axis of the second shaft member (worm shaft $7$), and which is provided between the first outer blade portion ($110a$) and the second outer blade portion ($110b$) in a circumferential direction with respect to the first axis (P1), the second inner blade portion ($120b$) which is provided to the second coupling base portion (inner teeth member base portion $120$), which protrudes in the radially inward direction with respect to the second axis (P2), and which is provided between the second outer blade portion ($110b$) and the third outer blade portion ($110c$) in a circumferential direction with respect to the second axis (P2), the elastic member ($30$) which is made from a resin, and which includes an elastic member base portion ($140$), a first rotation direction elastic portion ($140a$), a second rotation direction elastic portion ($140b$), a third rotation direction elastic portion ($140c$), a fourth rotation elastic portion ($140d$), and an axial elastic portion ($141$), the elastic member base portion ($140$) which is provided between the first shaft member assembly ($20$) and the second shaft member assembly ($21$) in a direction of the first axis (P1), the first rotation direction elastic portion ($140a$) which is provided to the elastic member base portion ($140$), and which is provided between the first outer blade portion ($110a$) and the first inner blade portion ($120a$) in the circumferential direction with respect to the first axis (P1), the second rotation direction elastic portion ($140b$) which is provided to the elastic member base portion ($140$), and which is provided between the second outer blade portion ($110b$) and the first inner blade portion ($120a$) in the circumferential direction with respect to the first axis (P1), the third rotation direction elastic portion ($140c$) which is provided to the elastic member base portion ($140$), and which is provided between the second outer blade portion ($110b$) and the second inner blade portion ($120b$) in the circumferential direction with respect to the first axis (P1), the fourth rotation direction elastic portion ($140d$) which is provided to the elastic member base portion ($140$), and which is provided between the third outer blade portion ($110c$) and the second inner blade portion ($120b$) in the circumferential direction with respect to the first axis (P1), and the axial elastic portion ($141$) which is provided to the elastic member base portion ($140$), which protrudes in the direction of the first axis (P1) from the first shaft member (motor shaft $4a$) toward the second shaft member (worm shaft $7$), which includes an axial elastic portion base portion ($141b$) adjacent to the elastic portion base portion ($140$), and an axial elastic portion tip end portion ($141a$) abutted on the second shaft member assembly ($21$), and a line (X1) connecting the axial elastic portion base portion ($141b$) and the axial elastic portion tip end portion ($141a$) being inclined with respect to the first axis (P1).

In this aspect, the elastic member is made from the resin material. Accordingly, it is possible to widen the region having the low rigidity, relative to a case where the elastic member is made from the metal material. Furthermore, in the axial elastic portion, the line X1 connecting the axial elastic portion base portion and the axial elastic portion tip end portion is inclined with respect to the first axis. Accordingly, the axial elastic portion can generate the elastic force by the bending deformation. Consequently, it is further decease the rigidity, relative to the case of the compressive deformation. Therefore, it is possible to suppress the influence (the vibration, the torque variation, and so on) on the worm gear (the worm wheel and the worm shaft) at the driving of the electric motor, due to the misalignment of the axes of the first axis member assembly and the second axis member assembly.

In a preferred aspect, the axial elastic portion ($141$) includes an axial elastic portion annular portion ($143$) surrounding the first axis (P1).

In this aspect, a portion of the axial elastic portion which is abutted on the first shaft member assembly has the annular shape. Accordingly, the entire circumference of the axial elastic portion can be abutted on the first shaft member assembly. Consequently, it is possible to generate the appropriate elastic force with respect to the relative falling between the first shaft member assembly and the second shaft member assembly, dependently of the falling direction.

In a preferred aspect, the axial elastic portion annular portion ($143$) is provided to an axial elastic portion tip end portion ($141a$) abutted on the first axial member assembly.

In this aspect, when the force to decrease the axial clearance between the first shaft member assembly and the second shaft member assembly, and to decrease the axial size of the axial elastic portion is applied, in the axial elastic portion, the diameter of the annular portion is decreased, and the axial elastic portion is compressed and deformed in the circumferential direction. Accordingly, it is possible to improve the durability of the annular portion. On the other hand, in case of the tapered shape in which the annular portion is inclined in the widening direction, the annular portion receives the tension force at the deformation of the axial elastic portion. Consequently, the possibility of the generation of the damage such as the crack is increased.

In a preferred aspect, the axial elastic portion ($141$) has a tapered shape in which an outside diameter with respect to the first axis (P1) is gradually decreased in the direction of the first axis (P1) from the first shaft member (motor shaft $4a$) side toward the second shaft member (worm shaft $7$) side.

In this aspect, the inside of the axial elastic portion annular portion is closed by the elastic member base portion bottom portion. Accordingly, it is possible to improve the rigidity of the axial elastic portion annular portion.

The entire contents of Japanese Patent Application No. 2018-148330 filed Aug. 7, 2018 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A steering device comprising:
a rack bar which includes a rack teeth portion, and which is arranged to turn steered wheels;
a pinion shaft including a pinion teeth portion arranged to be engaged with the rack teeth portion of the rack bar;
a worm wheel which is arranged to rotate as a unit with the pinion shaft, and which includes a wheel teeth portion;
a worm shaft including a worm teeth portion arranged to be engaged with the wheel teeth portion of the worm wheel;
an electric motor which includes a motor shaft, and which is arranged to rotate the worm shaft;
a coupling including a first coupling member, a second coupling member, and an elastic member,
a first shaft member being one of the worm shaft and the motor shaft;
a second shaft member being the other of the worm shaft and the motor shaft;
a first shaft member assembly including the first shaft member and the first coupling member;
a second shaft member assembly including the second shaft member and the second coupling member;
the first coupling member including a first coupling base portion, a first outer blade portion, a second outer blade portion, and a third outer blade portion,
the first coupling base portion provided to the first shaft member,
the first outer, blade portion which is provided to the first coupling base portion, and which protrudes in a radially outward direction with respect to a first axis which is a rotation axis of the first shaft member,
the second outer blade portion which is provided to the first coupling base portion, and which protrudes in the radially outward direction with respect to the first axis,
the third outer blade portion which is provided to the first coupling base portion, and which protrudes in the radially outward direction with respect to the first axis,
the second coupling member including a second coupling base portion, a first inner blade portion, and a second inner blade portion,
the second coupling base portion provided to the second shaft member,
the first inner blade portion which is provided to the second coupling base portion, which protrudes in a radially inward direction with respect to a second axis that is a rotation axis of the second shaft member, and which is provided between the first outer blade portion and the second outer blade portion in a circumferential direction with respect to the first axis,
the second inner blade portion which is provided to the second coupling base portion, which protrudes in the radially inward direction with respect to the second axis, and which is provided between the second outer blade portion and the third outer blade portion in a circumferential direction with respect to the second axis,
the elastic member which is made from a resin, and which includes an elastic member base portion, a first rotation direction elastic portion, a second rotation direction elastic portion, a third rotation direction elastic portion, a fourth rotation elastic portion, and an axial elastic portion,
the elastic member base portion which is provided between the first shaft member assembly and the second shaft member assembly in a direction of the first axis,
the first rotation direction elastic portion which is provided to the elastic member base portion, and which is provided between the first outer blade portion and the first inner blade portion in the circumferential direction with respect to the first axis,
the second rotation direction elastic portion which is provided to the elastic member base portion, and which is provided between the second outer blade portion and the first inner blade portion in the circumferential direction with respect to the first axis,
the third rotation direction elastic portion which is provided to the elastic member base portion, and which is provided between the second outer blade portion and the second inner blade portion in the circumferential direction with respect to the first axis,
the fourth rotation direction elastic portion which is provided to the elastic member base portion, and which is provided between the third outer blade portion and the second inner blade portion in the circumferential direction with respect to the first axis, and
the axial elastic portion which is provided to the elastic member base portion, and which is arranged to be bent in a direction to be inclined with respect to the first axis when a clearance between the first shaft member assembly and the second shaft member assembly in the direction of the first axis is decreased.

2. The steering device as claimed in claim 1, wherein the axial elastic portion protrudes in the direction of the first axis from the first shaft member toward the second shaft member.

3. The steering device as claimed in claim 2, wherein the axial elastic portion includes an axial elastic portion annular portion surrounding the first axis.

4. The steering device as claimed in claim 3, wherein the axial elastic portion annular portion is provided to an axial elastic portion tip end portion abutted on the first axial member assembly.

5. The steering device as claimed in claim 4, wherein the axial elastic portion has a tapered shape in which an outside diameter with respect to the first axis is gradually decreased in the direction of the first axis from the first shaft member side toward the second shaft member side.

6. The steering device as claimed in claim 3, wherein the elastic member base portion includes an elastic member base portion main body portion and an elastic member base portion bottom portion; the elastic member base portion main body portion is provided outside the axial elastic portion annular portion in a radial direction with respect to the first axis; the elastic member base portion bottom portion is provided inside the axial elastic portion annular portion in the radial direction with respect to the first axis; and the elastic member base portion bottom portion has a plate shape perpendicular to the first axis.

7. The steering device as claimed in claim 6, wherein the elastic member base portion main body portion has a plate shape perpendicular to the first axis; the elastic member base portion main body portion includes an elastic member base portion main body portion first end surface and an elastic member base portion main body portion second end surface which are a pair of end surfaces in the direction of the first axis; the elastic member base portion main body portion first end surface is closer to the second shaft member than the elastic member base portion main body portion second end surface; the elastic member base portion main body portion second end surface is provided on a side opposite to the elastic member base portion main body portion first end surface;

the elastic member base portion bottom portion includes an elastic member base portion bottom portion first end surface and an elastic member base portion bottom portion second end surface which are a pair of end surfaces in the direction of the first axis; the elastic member base portion bottom portion first end surface is closer to the second shaft member than the elastic member base portion bottom portion second end surface; the elastic member base portion bottom portion second end surface is provided on a side opposite to the elastic member base portion bottom portion first end surface; and the elastic member base portion bottom portion first end surface is provided at a position farther from the second shaft member than the elastic member base portion main body portion first end surface in the direction of the first axis.

8. The steering device as claimed in claim 6, wherein the elastic member base portion bottom portion includes a through hole penetrating through the elastic member base portion bottom portion in the direction of the first axis.

9. The steering device as claimed in claim 2, wherein the axial elastic portion includes an axial elastic portion tip end portion abutted on the second shaft member assembly, and which has an arc shape in a section passing through the first axis; and the axial elastic portion protrudes from an axial elastic portion base portion adjacent to the elastic member base portion, toward the axial elastic portion tip end portion.

10. The steering device as claimed in claim 2, wherein a thickness of the axial elastic portion in a direction perpendicular to the first axis in a section passing through the first axis is gradually decreased from an axial elastic portion base portion adjacent to the elastic member base portion, toward an axial elastic portion tip end portion abutted on the second shaft member assembly.

11. The steering device as claimed in claim 1, wherein the first rotation direction elastic portion, the second rotation direction elastic portion, the third rotation direction elastic portion, and the fourth rotation direction elastic portion includes, respectively, rotation direction elastic portion main body portions, and rotation direction elastic portion protruding portions; each of the rotation direction elastic portion main body portions is apart from the first outer blade portion, the second outer blade portion, and the third outer blade portion in the circumferential direction with respect to the first axis in a no load state where a torque is not transmitted from the first shaft member assembly to the second shaft member assembly; and the rotation direction elastic portion protruding portions are provided to the rotation direction elastic portion main body portion; the rotation direction elastic portion protruding portions protrude, respectively, toward the first outer blade portion, the second outer blade portion, and the third outer blade portion; and the rotation direction elastic portion protruding portions are abutted on the first outer blade portion, the second outer blade portion, and the third outer blade portion in the no load state.

12. The steering device as claimed in claim 11, wherein each of the rotation direction elastic portion protruding portion is provided outside one of the rotation direction elastic portion main body portions in a radial direction with respect to the first axis.

13. The steering device as claimed in claim 12, wherein a third line is defined by a line which divides the first rotation direction elastic portion into equal portions in a circumferential direction with respect to the first axis, and which is perpendicular to the first axis; and the rotation direction elastic portion protruding portion is formed so that an angle $\alpha$ sandwiched by the third line and an inside surface of the rotation direction elastic portion protruding portion in the radial direction with respect to the first axis is an acute angle.

14. A steering device comprising:

a rack bar which includes a rack teeth portion, and which is arranged to turn steered wheels;

a pinion shaft including a pinion teeth portion arranged to be engaged with the rack teeth portion of the rack bar;

a worm wheel which is arranged to rotate as a unit with the pinion shaft, and which includes a wheel teeth portion;

a worm shaft including a worm teeth portion arranged to be engaged with the wheel teeth portion of the worm wheel;

an electric motor which includes a motor shaft, and which is arranged to rotate the worm shaft;

a coupling including a first coupling member, a second coupling member, and an elastic member, a first shaft member being one of the worm shaft and the motor shaft;

a second shaft member being the other of the worm shaft and the motor shaft;

a first shaft member assembly including the first shaft member and the first coupling member;

a second shaft member assembly including the second shaft member and the second coupling member;

the first coupling member including a first coupling base portion, a first outer blade portion, a second outer blade portion, and a third outer blade portion, the first coupling base portion provided to the first shaft member, the first outer blade portion which is provided to the first coupling base portion, and which protrudes in a radially outward direction with respect to a first axis which is a rotation axis of the first shaft member, the second outer blade portion which is provided to the first coupling base portion, and which protrudes in the radially outward direction with respect to the first axis, the third outer blade portion which is provided to the first coupling base portion, and which protrudes in the radially outward direction with respect to the first axis, the second coupling member including a second coupling base portion, a first inner blade portion, and a second inner blade portion, the second coupling base portion provided to the second shaft member, the first inner blade portion which is provided to the second coupling base portion, which protrudes in a radially inward direction with respect to a second axis that is a rotation axis of the second shaft member, and which is provided between the first outer blade portion and the second outer blade portion in a circumferential direction with respect to the first axis, the second inner blade portion which is provided to the second coupling base portion, which protrudes in the radially inward direction with respect to the second axis, and which is provided between the second outer blade portion and the third outer blade portion in a circumferential direction with respect to the second axis, the elastic member which is made from a resin, and which includes an elastic member base portion, a first rotation direction elastic portion, a second rotation direction elastic portion, a third rotation direction elastic portion, a fourth rotation elastic portion, and an axial elastic portion, the elastic member base portion which is provided between the first shaft member assembly and the second shaft member assembly in a direction of the first axis, the first rotation direction elastic portion which is provided to the elastic member base portion, and which is provided between the first outer blade portion and the first inner blade portion in the circumferential direction with respect to the first axis, the second rotation direction elastic portion which is provided to the elastic member base portion, and which is provided between the second outer blade portion and the first inner blade portion in the circumferential direction with respect to the first axis, the third rotation direction elastic portion which is provided to the elastic member base portion, and which is provided between the second outer blade portion and the second inner blade portion in the circumferential direction with respect to the first axis, the fourth rotation direction elastic portion which is provided to the elastic member base portion, and which is provided between the third outer blade portion and the second inner blade portion in the circumferential direction with respect to the first axis, and the axial elastic portion which is provided to the elastic member base portion, which protrudes in the direction of the first axis from the first shaft member toward the second shaft member, which includes an axial elastic portion base portion adjacent to the elastic portion base portion, and an axial elastic portion tip end portion abutted on the second shaft member assembly, and a line connecting the axial elastic portion base portion and the axial elastic portion tip end portion being inclined with respect to the first axis.

15. The steering device as claimed in claim 14, wherein the axial elastic portion includes an axial elastic portion annular portion surrounding the first axis.

16. The steering device as claimed in claim 15, wherein the axial elastic portion annular portion is provided to an axial elastic portion tip end portion abutted on the first axial member assembly.

17. The steering device as claimed in claim 16, wherein the axial elastic portion has a tapered shape in which an outside diameter with respect to the first axis is gradually decreased in the direction of the first axis from the first shaft member side toward the second shaft member side.

* * * * *